US010692121B2

(12) United States Patent
Stephenson

(10) Patent No.: US 10,692,121 B2
(45) Date of Patent: Jun. 23, 2020

(54) SYSTEMS AND METHODS FOR FACILITATING THE PROCUREMENT OF ITEMS

(71) Applicant: United Parcel Service of America, Inc., Atlanta, GA (US)

(72) Inventor: Timothy Nelson Stephenson, Milton, GA (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 870 days.

(21) Appl. No.: 14/918,180

(22) Filed: Oct. 20, 2015

(65) Prior Publication Data

US 2016/0110788 A1 Apr. 21, 2016

Related U.S. Application Data

(60) Provisional application No. 62/065,801, filed on Oct. 20, 2014.

(51) Int. Cl.
*G06Q 30/06* (2012.01)
*G06Q 30/02* (2012.01)
(Continued)

(52) U.S. Cl.
CPC ....... *G06Q 30/0613* (2013.01); *G06Q 10/087* (2013.01); *G06Q 30/0201* (2013.01); *G06Q 40/04* (2013.01); *G06Q 50/28* (2013.01)

(58) Field of Classification Search
CPC .................................................... G06Q 30/06
See application file for complete search history.

(56) References Cited

U.S. PATENT DOCUMENTS 5,734,890 A * 3/1998 Case ............... G06Q 30/02
6,701,299 B2 3/2004 Kraisser et al.
(Continued)

FOREIGN PATENT DOCUMENTS

WO WO 1997/031322 A1 8/1997

OTHER PUBLICATIONS

International Preliminary Examining Authority, Second Written Opinion for International Application No. PCT/US2015/056331, dated Sep. 16, 2016, 5 pages, European Patent Office, Germany.
(Continued)

*Primary Examiner* — Kurtis Gills
(74) *Attorney, Agent, or Firm* — Shook, Hardy and Bacon, L.L.P.

(57) ABSTRACT

Various embodiments are directed to systems and methods for requesting commodities/items from a plurality of competing vendors. In various embodiments, vendor information/data indicative of commodities/items offered by each vendor is received and stored, request information/data is received from a consumer indicative of the commodities/items desired, as well as any additional request parameters. The system filters the vendor information/data to identify those vendors who satisfy the request parameters, and displays a graphical user interface identifying these vendors to the consumer. The consumer may then select one or more of the identified vendors, and the system enables access to a bidding tool for each of the selected vendors to submit a detailed bid/response to provide the goods or services to the consumer. The consumer may then select one or more of the bids/responses and confirm the commodities/items requested.

21 Claims, 11 Drawing Sheets

(51) Int. Cl.
    *G06Q 10/08*     (2012.01)
    *G06Q 50/28*     (2012.01)
    *G06Q 40/04*     (2012.01)

(56) References Cited

U.S. PATENT DOCUMENTS

| | | | | |
|---|---|---|---|---|
| 8,046,269 | B2* | 10/2011 | Lee | G06Q 40/04 705/26.3 |
| 8,078,485 | B1* | 12/2011 | Kraehmueller | G06Q 10/063 705/7.11 |
| 8,200,527 | B1* | 6/2012 | Thompson | G06Q 10/0639 705/7.38 |
| 2002/0055900 | A1* | 5/2002 | Kansal | G06Q 10/0639 705/37 |
| 2002/0161697 | A1 | 10/2002 | Stephens et al. | |
| 2006/0190385 | A1* | 8/2006 | Dresden | G06Q 30/02 705/37 |
| 2011/0074587 | A1 | 3/2011 | Hamm et al. | |
| 2012/0265744 | A1* | 10/2012 | Berkowitz | G06F 17/30873 707/705 |
| 2014/0207584 | A1* | 7/2014 | Wicha | G06Q 30/0276 705/14.72 |
| 2015/0193709 | A1* | 7/2015 | Ramesh Babu | G06Q 10/0637 705/7.28 |

OTHER PUBLICATIONS

Allegro, "Trade Connect 8.1, Turning Instant Messaging Into Trader Productivity and Transparent Intraday Pricing", Dec. 9, 2011, retrieved from <http://www.allegrodev.com/collateral/connectivity/Trade-Connect-8-1-Product-Brief.pdf>, on Feb. 29, 2016, 2 pages.
International Searching Authority, International Search Report and Written Opinion for International Application No. PCT/US2015/056331, dated Jan. 25, 2016, 11 pages, European Patent Office, The Netherlands.
Wikihow Contributors, "How to Use Uber", *wikiHow*, retrieved from <http://www.wikihow.com/Use-Uber>, on Feb. 29, 2016, 5 pages.
Wikipedia Contributors, "Shipping Wars", retrieved from <https://en.wikipedia.org/w/index.php?title=Shipping_Wars&oldid=704633215>, on Feb. 29, 2016, 9 pages.
International Preliminary Examining Authority, International Preliminary Report on Patentability (Chapter II), including Applicant's dated Aug. 18, 2016 Response to ISA's dated Jan. 25, 2016 Written Opinion, for International Application No. PCT/US2015/056331, dated Jan. 30, 2017, 16 pages, European Patent Office, Germany.
Office Action Received for Canadian Patent Application No. 2,963,933 dated Feb. 1, 2019, 8 pages.

* cited by examiner

Request: New

UPS Building:
INDIANAPOLIS 81ST — 1011
07 - EAST / 49 - Ohio Valley

Campaign: — 1012
Peak Season 2015

Requested By:
Tim - OV Stephenson
404-828-8228

Needed Begin Date: — 1014
11/8/2015

Needed End Date:
12/22/2015

Bid Open Date:
9/14/2015 12:00 AM

Bid Closed Date: — 1015
Enter date

Justification: — 1013
Rental Needs

Comment: (will be visible to all selected suppliers)
Please deliver to Automotive shop Enter Supplier Responses Manually — 1016

Priority: Normal

Next    Cancel

Figure 8A

SYSTEMS AND METHODS FOR FACILITATING THE PROCUREMENT OF ITEMS

CROSS-REFERENCE TO RELATED APPLICATIONS

This patent application claims priority to U.S. Provisional Patent Application Ser. No. 62/065,801 filed Oct. 20, 2014, the contents of which are incorporated herein by reference in their entirety.

BACKGROUND

Consumers, particularly large-scale business consumers, such as consumers (e.g., United Parcel Service of America, Inc.), and/or the like must periodically procure (e.g., lease and/or purchase) commodities/items/goods/services, such as equipment and services. For example, parcel delivery services may be required to lease additional transportation vehicles during peak shipping periods in order to move parcels from an origin to a destination in a timely manner. As yet another example, businesses may be required to purchase goods (e.g., auto repair parts) and/or services (e.g., automotive maintenance services) from one or more vendors.

Historically, consumer representatives (e.g., business employees/personnel) have been required to send numerous communications to local commodities/items vendors in order to ascertain whether local and/or national vendors are able to fulfill the consumer's commodity/item needs in a timely and cost effective manner. Upon receiving information/data from potentially numerous vendors, consumer representatives must make comparisons between the offerings of each of the plurality of vendors, even though the information/data provided by the vendors may be incomplete, in incompatible formats, or otherwise difficult to compare.

Thus, a need exists for systems and methods for facilitating the process of procuring commodities/items, including systems and methods for facilitating communication between consumers (e.g., business consumers) and vendors.

BRIEF SUMMARY

Various embodiments are directed to an item procurement system comprising one or more memory storage areas and one or more computer processors. In various embodiments, the item procurement system configured to: receive vendor data indicative of items available from a plurality of vendors, wherein the vendor data is associated with one or more vendor profiles each corresponding to an individual vendor; receive request data from a consumer that indicates one or more procurement parameters for procuring items; filter the vendor data by comparing the request data and the vendor data to identify one or more vendors providing items satisfying the procurement parameters; provide an interface indicating one or more vendors identified as satisfying the procurement parameters, wherein the interface is configured to permit selection of one or more of the identified vendors; and upon selection of one or more of the identified vendors, update vendor data associated with one or more vendor profiles corresponding to the selected identified vendors to enable access to a response tool for the selected identified vendors, wherein the response tool is configured to receive data indicative of a response to provide items to the consumer. In various embodiments, the procurement parameters comprise at least one of: a maximum distance away from a consumer location; a time period; a type of item; or a quantity of item. Moreover, in various embodiments, the interface is configured to indicate the locations of the one or more vendors via a graphically displayed map.

Various embodiments are further configured to provide a notification for each of the selected identified vendors. Moreover, in various embodiments, the response tool is configured to receive user input indicative of a response from the vendor and to provide the response to the consumer for review. Moreover, various embodiments are further configured to receive user input selecting one or more responses provided to the consumer; and upon selection of one or more responses, provide a notification to each vendor which submitted a response indicating the status of the respective responses. In various embodiments, the notifications comprise acceptance notifications to be sent to those vendors associated with the accepted responses and rejection notifications to be sent to those vendors associated with the unselected responses. Moreover, various embodiments are further configured to receive one or more reference identifiers associated with items associated with the one or more selected responses.

Moreover, the item procurement system may be further configured to monitor one or more performance attributes of one or more of the vendors, and determine a performance score indicative of the one or more performance attributes and store the performance score in association with the corresponding vendor profile.

Various embodiments are directed to a computer-implemented method for procuring one or more items. In various embodiments, the method comprises the steps of: receiving, via one or more processors, vendor data indicative of items available from a plurality of vendors, and wherein the vendor data is associated with one or more vendor profiles each corresponding to an individual vendor; receiving, via the one or more processors, request data from a consumer that indicates one or more procurement parameters for procuring items; filtering, via the one or more processors, the vendor data by comparing the request data and the vendor data to identify one or more vendors providing items satisfying the procurement parameters; providing, via the one or more processors, an interface indicating one or more vendors identified as satisfying the procurement parameters, wherein the interface is configured to permit selection of one or more of the identified vendors; and upon selection of one or more of the identified vendors, updating, via the one or more processors, vendor data associated with one or more vendor profiles corresponding to the selected identified vendors to enable access to a response tool for the selected identified vendors, wherein the response tool is configured to receive data indicative of a response to provide items to the consumer.

In various embodiments, the procurement parameters comprise at least one of: a maximum distance away from a consumer location; a time period, a type of item; or a quantity of item. Moreover, the method may comprise further steps for providing a notification to each of the selected identified vendors. Moreover, in various embodiments, the response tool is configured to receive user input indicative of a response from the vendor and to provide the response to the consumer for review.

Moreover, in various embodiments the method further comprises steps for receiving user input selecting one or more responses provided to the consumer; and upon selection of one or more responses, providing a notification to each vendor which submitted a response indicating the status of the respective responses. Moreover, various embodiments comprise further steps for monitoring one or more performance attributes of one or more of the vendors, and determining a performance score indicative of the one or more performance attributes and storing the performance score in association with the corresponding vendor profile.

Various embodiments are directed to a computer program product comprising at least one non-transitory computer-readable storage medium having computer-readable program code portions stored therein. In various embodiments, the computer-readable program code portions comprise an executable portion for receiving vendor data indicative of items available from a plurality of vendors, and wherein the vendor data is associated with one or more vendor profiles each corresponding to an individual vendor; an executable portion for request data from a consumer that indicates one or more procurement parameters for procuring items; an executable portion for filtering the vendor data by comparing the request data and the vendor data to identify one or more vendors providing items satisfying the procurement parameters; an executable portion for providing an interface indicating one or more vendors identified as satisfying the procurement parameters, wherein the interface is configured to permit selection of one or more of the identified vendors; and an executable portion for, upon selection of one or more of the identified vendors, updating vendor data associated with one or more vendor profiles corresponding to the selected identified vendors to enable access to a response tool for the selected identified vendors, wherein the response tool is configured to receive data indicative of a response to provide items to the consumer.

In various embodiments, the procurement parameters comprise at least one of: a maximum distance away from a consumer location; a time period, a type of item; or a quantity of item. Moreover, in various embodiments, the computer program product further comprises an executable portion for providing a notification to each of the selected identified vendors. In various embodiments, the response tool is configured to receive user input indicative of a response from the vendor and to provide the response to the consumer for review. Moreover, in various embodiments, the computer program product additionally comprises an executable portion for receiving user input selecting one or more responses provided to the consumer; and an executable portion for, upon selection of one or more responses, providing a notification to each vendor which submitted a response indicating the status of the respective responses. Moreover, in various embodiments, the computer program product additionally comprises an executable portion for monitoring one or more performance attributes of one or more of the vendors, and an executable portion for determining a performance score indicative of the one or more performance attributes and storing the performance score in association with the corresponding vendor profile.

BRIEF DESCRIPTION OF THE SEVERAL VIEWS OF THE DRAWINGS

Reference will now be made to the accompanying drawings, which are not necessarily drawn to scale, and wherein:

FIGS. 8A-8D are example user interfaces for accepting information/data defining parameters of a Request for Proposal.

DETAILED DESCRIPTION

Figure 1:
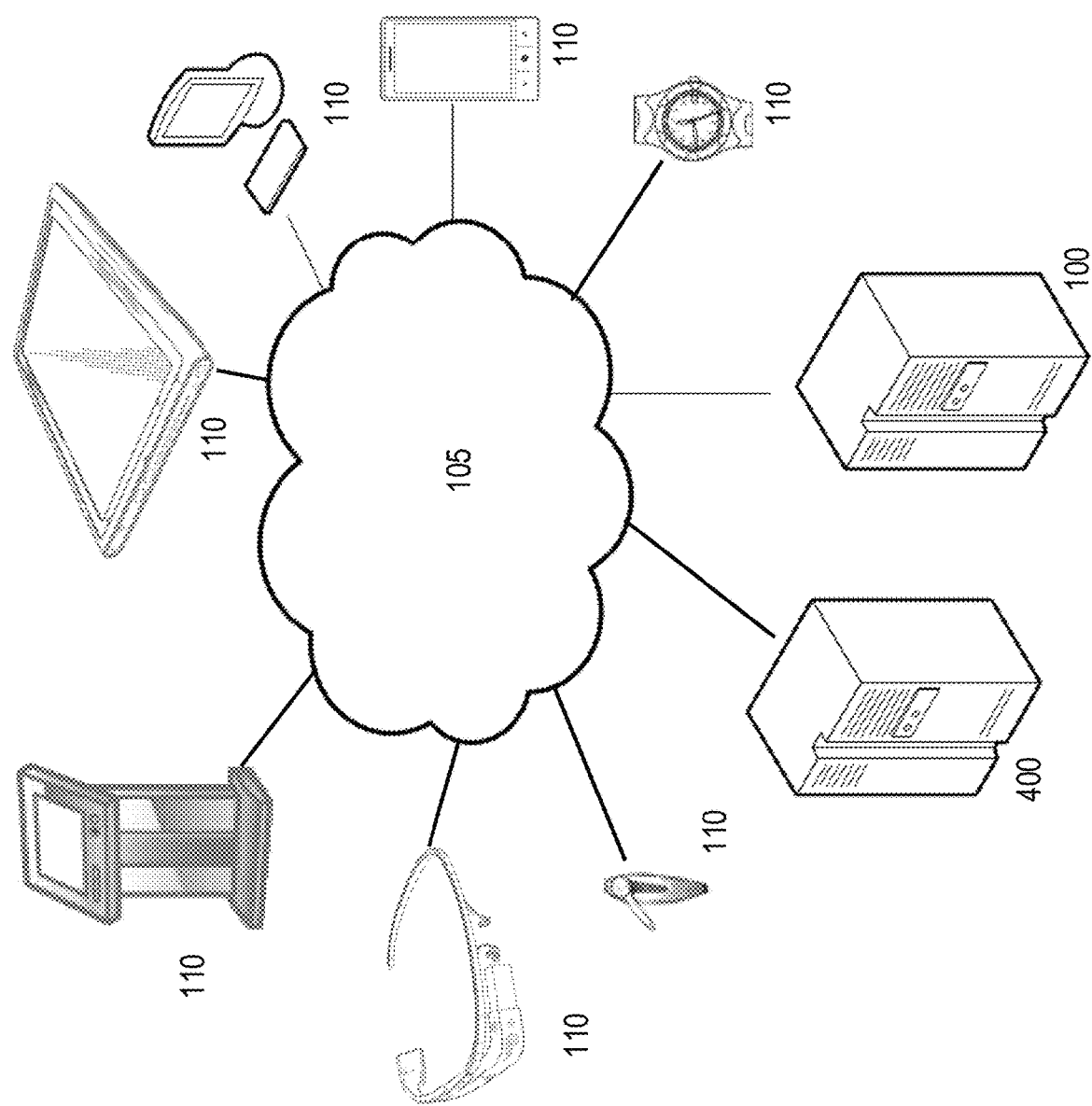
FIG. 1 is an overview of a system that can be used to practice embodiments of the present invention.

The present invention will now be described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. Like numbers refer to like elements throughout.

As described herein, the terms commodities, items, goods, services, and similar words may be used interchangeably herein. In one example, "goods" may refer to tangible goods, such as equipment, parts, consumer products, and/or the like. For example, equipment may comprise delivery vehicles (e.g., trucks, cars, bicycles, and/or the like), short-range vehicles (e.g., golf carts, ATVs, wheel chairs, furniture dollies, fork lifts, and/or the like), long-range vehicles (e.g., train cars, locomotives, aircraft, shipping containers, storage containers, ocean liners, tractor-trailers, and/or the like), passenger vehicles (e.g., buses, SUVs, trucks, vans, cars, and/or the like), production machinery, temporary and/or permanent buildings, and/or the like. Accordingly, the described concepts and principles apply to the procurement of services, such as services for the completion of a task (e.g., automotive repair and/or maintenance), temporary representatives services (e.g., temporary workers that may be needed by a business during busy seasons), and/or the like.

Moreover, as described herein, a "consumer" may be any entity capable of procuring commodities/items (e.g., through leasing and/or purchase). As non-limiting examples, a consumer may be an individual, a family, a business, a school, a university, a government entity (e.g., a local government, a regional government, a state government, a federal government), a non-profit entity, and/or the like, or a subunit thereof (e.g., a division, a department, a subsidiary, and/or the like).

Overview

Various embodiments of the present invention are directed to systems and methods for facilitating the procurement of commodities/items via lease, rental, purchase, or other words utilized interchangeably herein.

In various embodiments, a commodity/item procurement system may facilitate communications between consumer representatives (e.g., representatives) and vendor representatives (e.g., representatives) in order to improve the amount of communication necessary in order to procure goods for the consumer. The commodity/item procurement system may be configured to receive information/data indicative of consumer commodities/items procurement needs, as well as information/data indicative of vendor capacity.

In various embodiments, the commodity/item procurement system may be configured to compare the consumer commodity/item needs and the vendor capacity in order to identify possible vendors that may supply the needed commodities/items based at least in part on needed type of goods, quantity of goods, location of goods, timing of needed goods, and/or goods cost. In various embodiments, the commodity/item procurement system may comprise one or more communication systems configured to transmit and receive communications between consumer representatives and vendor representatives.

Moreover, in various embodiments, the commodity/item procurement system may be configured to automatically generate notifications/messages to be transmitted to vendor representatives regarded commodities/items needed by the consumer. For example, the commodity/item procurement system may be configured to automatically generate and transmit one or more Request for Proposals (RFPs) to one or more vendors in order to solicit service contract bids/responses from the various vendors.

The commodity/item procurement system may also be configured to facilitate communications between consumer representatives and vendor representatives regarding the one or more RFPs. As a non-limiting example, the commodity/item procurement system may facilitate submission of RFPs utilizing a common format in order to facilitate a comparison of bids/responses submitted by various vendors. Moreover, the commodity/item procurement system may facilitate the transmission of communications to the various vendors in order to notify each vendor whether they were selected to provide commodities/items to the consumer.

The commodity/item procurement system may comprise user interfaces to be presented to consumer representatives and/or vendor representatives in order to facilitate submission of information/data to the centralized computer program product. In various embodiments, a user interface presented to consumer representatives may comprise information/data different from that presented to vendor representatives. As a non-limiting example, the user interface presented to consumer representatives may comprise information/data regarding capacity and negotiated lease rates for a plurality of vendors and information/data regarding needed commodities/items. In contrast, the user interface to be provided to each vendor may comprise information/data corresponding only to that vendor.

Various embodiments of the present invention are directed to methods for facilitating procurement of commodities/items (e.g., via purchase and/or lease). In various embodiments, information/data indicative of commodities/items needs may be received. Such information/data may comprise information/data indicative of historical and/or anticipated commodity/item needs and/or information/data indicative of emergency commodity/item needs. Information/data indicative of vendor capacity may also be received. Based at least in part on a comparison between the information/data indicative of commodity/item needs and the information/data indicative of the vendor capacity, one or more RFPs may be automatically generated and transmitted to each vendor having sufficient capacity to provide commodities/items meeting the identified commodity/item needs. In various embodiments, one or more bids/responses are received from one or more vendors. Each bid/response may comprise information/data indicative of the cost to lease commodities/items from the vendor, the location of the commodities/items, the type of commodities/items available, and the quantity of commodities/items available. Based at least in part on the content of the one or more received bids, one or more vendors may be selected. Upon selecting one or more vendors, one or more notifications/messages may be automatically generated and sent to the selected vendors.

Computer Program Products, Methods, and Computing Entities

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises a combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Exemplary System Architecture

FIG. 1 provides an illustration of an exemplary embodiment of the present invention. As shown in FIG. 1, this particular embodiment may include one or more consumer computing entities 100, one or more networks 105, one or more vendor computing entities 110, and/or one or more procurement systems 400. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

1. Example Consumer Computing Entities

Figure 2:
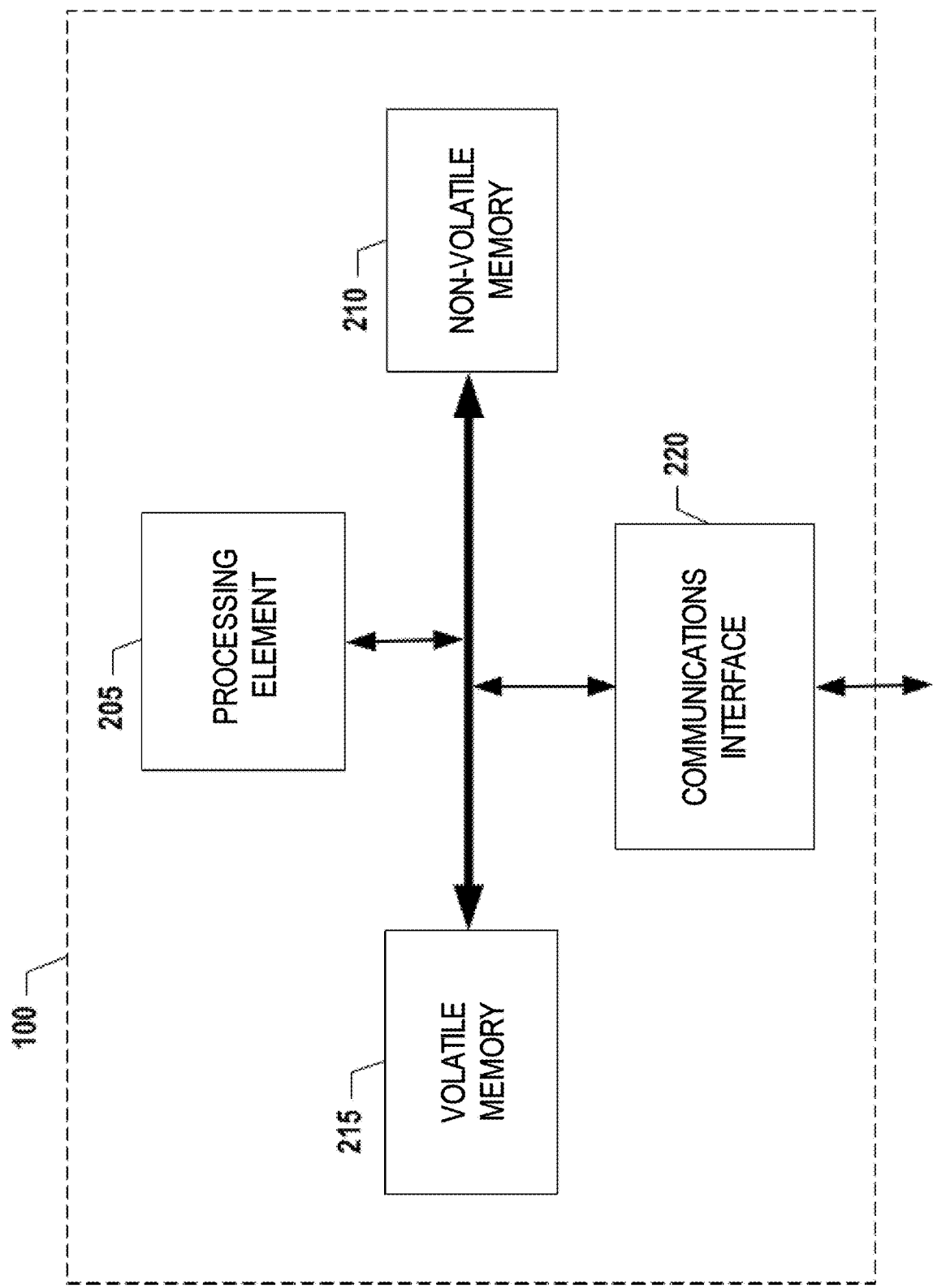
FIG. 2 is an exemplary schematic diagram of a consumer computing entity according to various embodiments of the present invention.

FIG. 2 provides a schematic of a consumer computing entity 100 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, televisions, dongles, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining/identifying, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the consumer computing entity 100 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the consumer computing entity 100 may include or be in communication with one or more processing elements 205 (also referred to as processors, processing circuitry, and/or similar terms used herein interchangeably) that communicate with other elements within the consumer computing entity 100 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the consumer computing entity 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or information/data that is stored in a computer-readable storage medium using one or more database models, such as a hierarchical database model, network model, relational model, entity-relationship model, object model, document model, semantic model, graph model, and/or the like.

In one embodiment, the consumer computing entity 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the consumer computing entity 100 with the assistance of the processing element 205 and operating system.

As indicated, in one embodiment, the consumer computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired information/data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the consumer computing entity 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol.

Although not shown, the consumer computing entity 100 may include or be in communication with one or more input elements, such as a keyboard input, a mouse input, a touch screen/display input, motion input, movement input, audio input, pointing device input, joystick input, keypad input, and/or the like. The consumer computing entity 100 may also include or be in communication with one or more output elements (not shown), such as audio output, video output, screen/display output, motion output, movement output, and/or the like.

In one embodiment, the consumer computing entity 100 may include various payment features and functionalities. Payments (received or paid) may be in a variety of forms, such as via debit cards, credit cards, direct credits, direct debits, cash, check, money order, Internet banking, e-commerce payment networks/systems (e.g., PayPal™, Google Wallet, Amazon Payments), virtual currencies (e.g., Bitcoins), award or reward points, and/or the like. Such payments may be made using a variety of techniques and approaches, including through NFC technologies such as PayPass, Android Beam, BlueTooth low energy (BLE), and various other contactless payment systems. Further, such payment technologies may include PayPal Beacon, Apple Pay, Android Pay, Booker, Erply, Leaf, Leapset, Micros, PayPal Here, Revel, ShopKeep, TouchBistro, Vend, and/or the like.

As will be appreciated, one or more of the consumer computing entity's 100 components may be located remotely from other consumer computing entity 100 components, such as in a distributed system. Furthermore, one or more of the components may be combined and additional components performing functions described herein may be included in the consumer computing entity 100. Thus, the consumer computing entity 100 can be adapted to accommodate a variety of needs and circumstances. As will be recognized, these architectures and descriptions are provided for exemplary purposes only and are not limiting to the various embodiments.

2. Example Vendor Computing Entities

Figure 3:
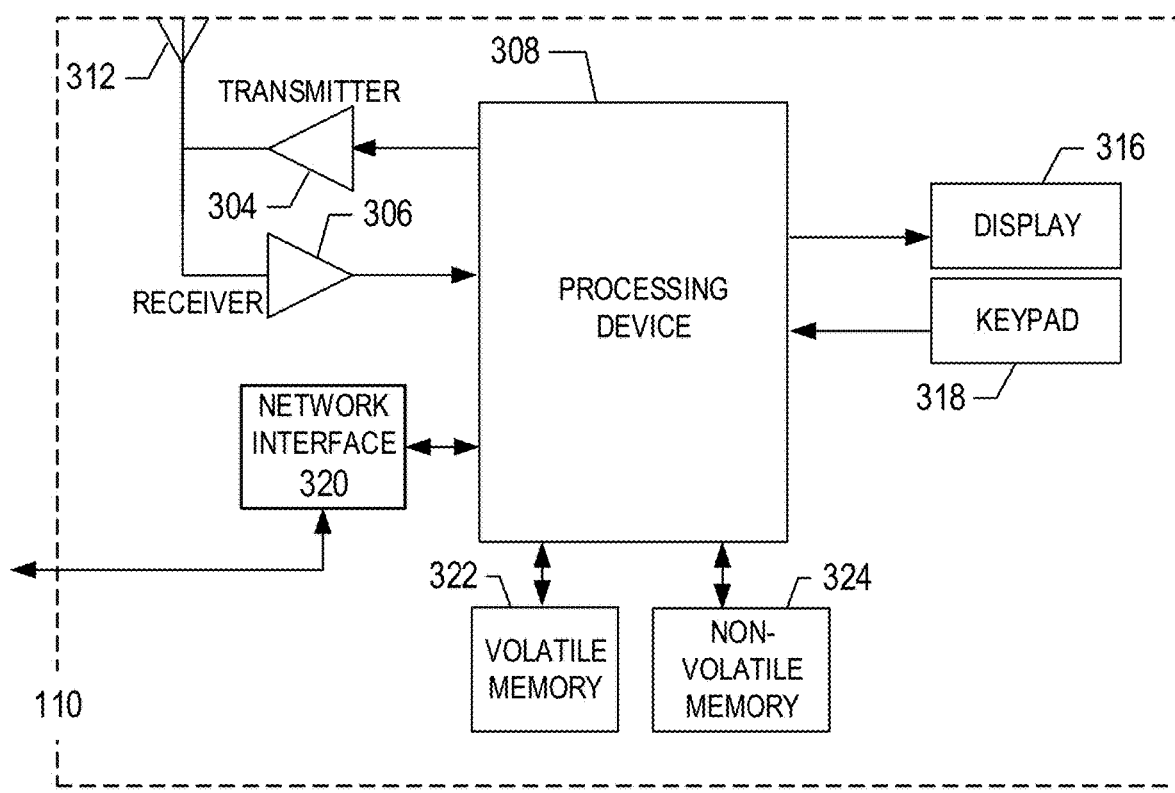
FIG. 3 is an exemplary schematic diagram of a vendor computing entity according to various embodiments of the present invention.

A user may be an individual, a family, a company, an organization, an entity, a department within an organization, a representative of an organization and/or person, and/or the like—whether or not associated with a consumer. To do so, a user may operate a vendor computing entity 110 that may include one or more components that are functionally similar to those of the consumer computing entity 100. FIG. 3 provides an illustrative schematic representative of a vendor computing entity 110 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Vendor computing entities 110 can be operated by various parties, including consumer representatives (sorters, loaders, delivery drivers, network administrators, and/or the like) and/or vendor representatives. As shown in FIG. 3, the vendor computing entity 110 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information/data in accordance with air interface standards of applicable wireless systems. In this regard, the vendor computing entity 110 may be capable of operating with one or more air interface standards, communication protocols, modulation types, and access types. More particularly, the vendor computing entity 110 may operate in accordance with any of a number of wireless communication standards and protocols, such as those described above with regard to the consumer computing entity 100. In a particular embodiment, the vendor computing entity 110 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the vendor computing entity 110 may operate in accordance with multiple wired communication standards and protocols, such as those described above with regard to the consumer computing entity 100 via a network interface 320.

Via these communication standards and protocols, the vendor computing entity 110 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The vendor computing entity 110 can also download changes, add-ons, and updates, for instance, to its firmware, software (e.g., including executable instructions, applications, program modules), and operating system.

According to one embodiment, the vendor computing entity 110 may include location determining/identifying aspects, devices, modules, functionalities, and/or similar words used herein interchangeably. For example, the vendor computing entity 110 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the vendor computing entity's 110 position in connection with a variety of other systems, including cellular towers, Wi-Fi access points, and/or the like. Similarly, the vendor computing entity 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The vendor computing entity 110 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the vendor computing entity 110 to interact with and/or cause display of information/data from the consumer computing entity 100, as described herein. The user input interface can comprise any of a number of devices or interfaces allowing the vendor computing entity 110 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the vendor computing entity 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The vendor computing entity 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the vendor computing entity 110. As indicated, this may include a user application that is resident on the entity or accessible through a browser or other user interface for communicating with the consumer computing entity 100 and/or various other computing entities.

In another embodiment, the vendor computing entity 110 may include one or more components or functionality that are the same or similar to those of the consumer computing entity 100, as described in greater detail above. As will be recognized, these architectures and descriptions are provided for exemplary purposes only and are not limiting to the various embodiments.

3. Example Procurement System

A procurement system 400 may include one or more components that are functionally similar to those of the consumer computing entity 100 and/or a vendor computing entity 110 as described and illustrated herein. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein.

Like the consumer computing entity 100 and/or the vendor computing entity 110, the procurement system 400 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The procurement system 400 can also download changes, add-ons, and updates, for instance, to its firmware, software (e.g., including executable instructions, applications, program modules), and operating system.

The procurement system 400 may also comprise a user interface (that can include a display coupled to a processing element) and/or a user input interface (coupled to a processing element). For example, the user interface may be a user application, browser, user interface, and/or similar words used herein interchangeably executing on and/or accessible via the procurement system 400 to interact with and/or cause display of information/data from the consumer computing entity 100 and/or vendor computing entity 110, as described herein. The user input interface can comprise any of a number of devices or interfaces allowing the procurement system 400 to receive data, such as a keypad (hard or soft), a touch display, voice/speech or motion interfaces, or other input device. In embodiments including a keypad, the keypad can include (or cause display of) the conventional numeric (0-9) and related keys (#, *), and other keys used for operating the procurement system 400 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The procurement system 400 can also include volatile storage or memory and/or non-volatile storage or memory, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the procurement system 400. As indicated, this may include a user application that is resident on the entity or accessible through a browser or other user interface for communicating with the consumer computing entity 100, the vendor computing entity 110 and/or various other computing entities.

In another embodiment, the procurement system 400 may include one or more components or functionality that are the same or similar to those of the consumer computing entity 100 and/or the vendor computing entity 110, as described in greater detail above. As will be recognized, these architectures and descriptions are provided for exemplary purposes only and are not limiting to the various embodiments.

Exemplary System Operation

Figure 4:
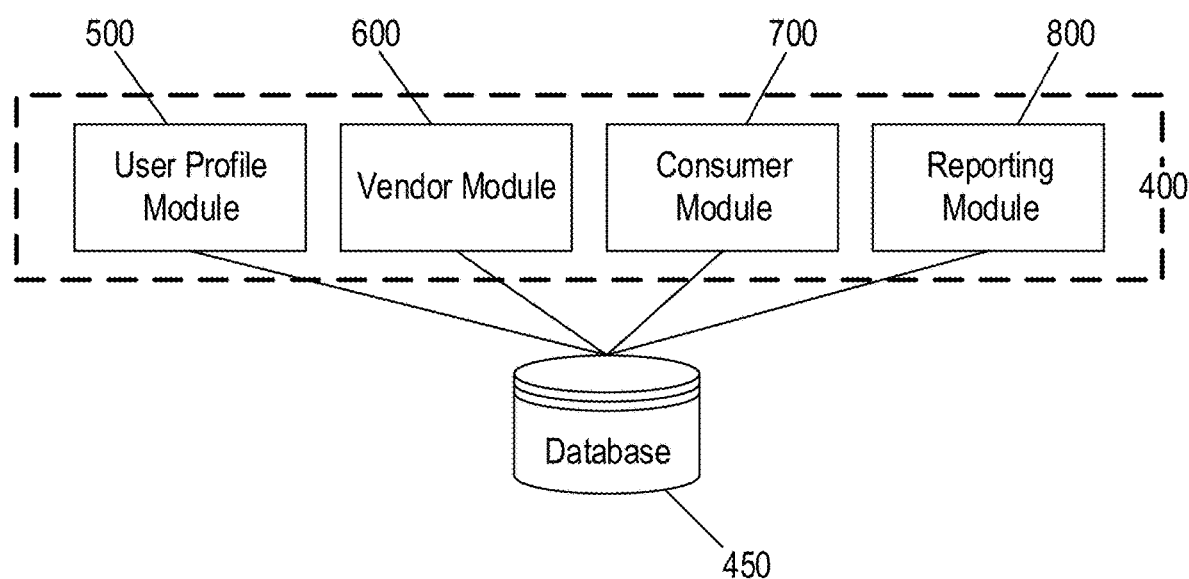
FIG. 4 is an exemplary schematic diagram illustrating the relationship between various modules and one or more storage media according to various embodiments of the present invention.
Figure 5:
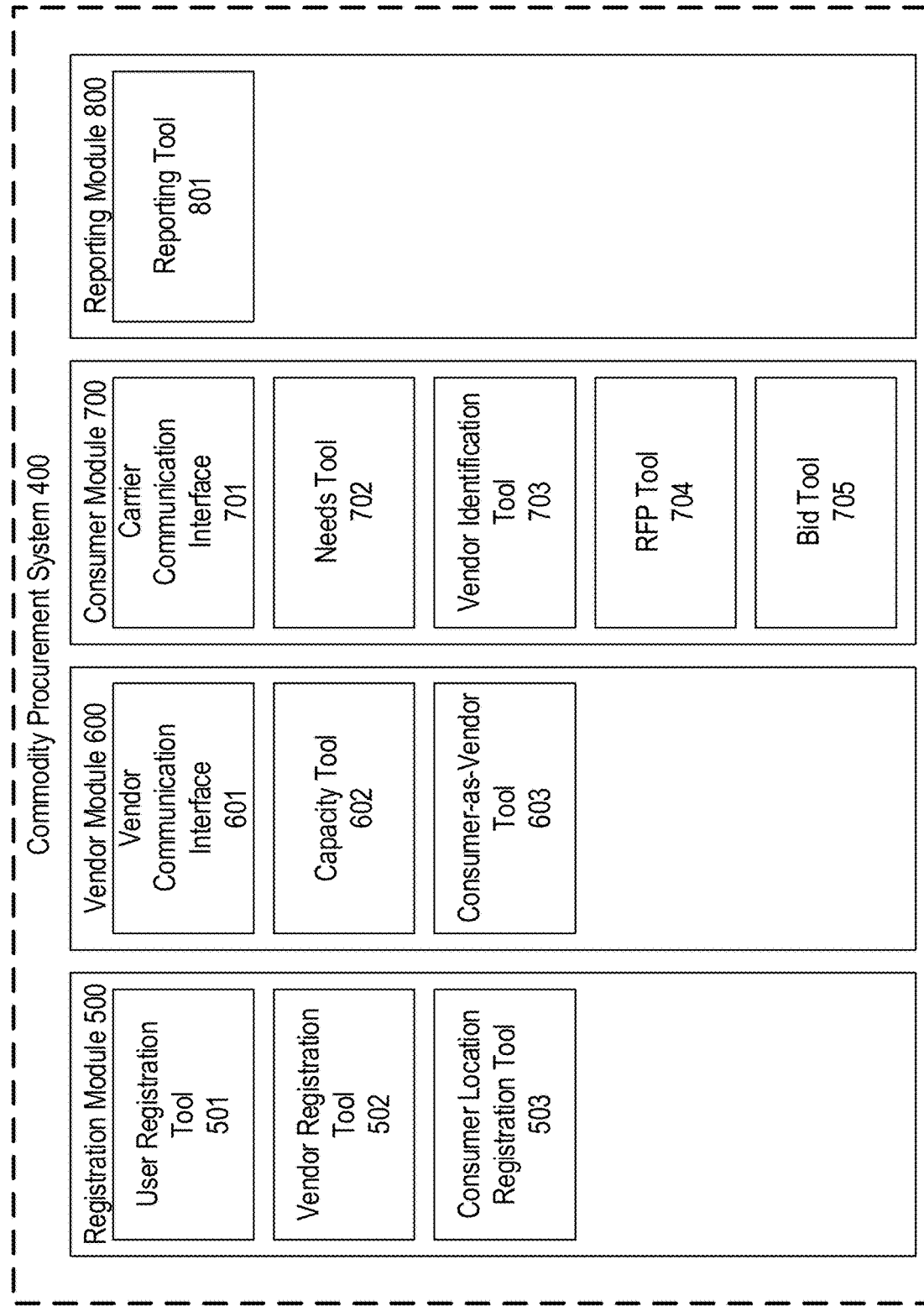
FIG. 5 is an exemplary schematic diagram of a commodity/item procurement system according to various embodiments of the present invention.

Reference will now be made to FIGS. 4-5, which illustrate schematic diagrams of a commodity/item procurement system 400 according to various embodiments of the present invention. As illustrated in FIG. 4, the commodity/item procurement system 400 may comprise one or more program modules (e.g., modules 500-800) in communication with at least one database 450. In various embodiments, the one or more program modules 500-800 may be configured to transmit information/data to the database 450 for storage therein, and may be configured to retrieve information/data stored in database 450.

Moreover, as illustrated in FIG. 5, the one or more program modules 500-800 may be configured to facilitate procurement of commodities/items (e.g., via purchase and/or lease). Such modules allow consumers to identify commodity/item needs and seek out needed commodities/items from one or more vendors. As a non-limiting example, such modules may allow consumers to identify commodities/items needed for only a short period of time (e.g., less than one month) and seek one or more short-term leases to meet the short-term need. Moreover, in various embodiments, such modules may allow consumers to identify commodities/items needed for a long periods of time (e.g., at least one month), and seek appropriate long-term leases and/or purchase options to meet the long-term need.

Additionally, as described in greater detail herein, various embodiments of the present invention may facilitate a comparison between the cost to lease one or more commodities/items against the cost to transfer one or more commodities/items owned by the consumer to the location of need. Thus, various embodiments of the present invention may facilitate a comparison of commodities/items available for lease from a plurality of vendors and unused commodities/items owned and/or operated by the consumer that are located at various consumer locations.

1. Registration Module

In various embodiments, a registration module 500 is configured to register/enroll one or more users with the commodity/item procurement system 400. A user may be an individual, a company, an organization, an entity, a department within an organization, a representative of an organization and/or individual, and/or the like. The registration module 500 may be configured to receive input identifying the user as a consumer user or a vendor user. As will be described in greater detail herein, consumer users and vendor users may be granted access to different information/data and/or tools stored in association with the commodity/item procurement system 400 (e.g., via a database 450). The user interface presented to consumer users may be different from that presented to vendor users. For example, consumer users may be granted access to at least a portion of the information/data associated with the consumer module (e.g., including information/data representative of various vendors), and vendor users may be granted access to at least a portion of the information/data associated with the vendor module (e.g., including information/data only related to the corresponding vendor). In various embodiments, the registration module 500 may be available publicly, such that any entity may register (e.g., as a vendor). However, in various embodiments, the registration module 500 may only be available to select entities, and accordingly access to the registration module 500 may be limited. For example, for a consumer-controlled commodity/item procurement system 100, a representative of the consumer may selectively provide access to the registration module 500 by providing a hyperlink, an access code, and/or any other access-enabling code to a vendor and/or a representative of a vendor.

In various embodiments, the registration module 500 may comprise a user registration tool 501 configured to receive biographic and/or geographic information/data as a user input (e.g., via a registration user interface). For example, the user registration tool 501 may receive information/data indicative of the user's name, such as a first name, a last name, a company name, an entity name, a franchise name, and/or an organization name. The registration module 500 may also be configured to receive one or more addresses and/or facilities associated with the user (e.g., facility name, street address, city, state, postal code, and/or country). By receiving information/data indicative of the one or more facilities associated with a user, the user registration tool 501 may be configured to limit the user's access to information/data associated with that location and/or address. For example, a consumer user may be an employee working at a single regional consumer location. Thus, the employee may be granted access to request commodities/items for the single regional consumer location only. Similarly, a vendor user may be a vendor employee working at a single regional vendor facility (e.g., at a single vendor franchise). This vendor employee may therefore be granted access to update the vendor's capacity related to the single regional vendor facility only.

Upon an identification of a user as a consumer user, the user registration tool 501 may be configured to receive additional information/data corresponding to the user's job title, responsibilities, location, and/or the like. Such information/data may be indicative of the level of information/data access the user may be granted. In various embodiments, the user registration tool 501 may be configured to receive user job responsibility information/data indicative of one or more consumer locations for which the user may be associated, and thereby permit access for the user to information/data associated with those consumer locations only. For example, the user registration tool 501 may receive information/data identifying a user as a corporate industrial engineering user (IE user) requiring access to information/data associated with the entire United States. As an additional example, the user registration tool 501 may receive information/data identifying a user as a region equipment coordinator (REC) responsible for managing commodities/items operated by one or more regional consumer locations. As will be recognized, the user registration tool 501 may be configured to receive additional information/data corresponding to each user.

Upon identifying a user as a vendor user, the user registration tool 501 may be configured to receive additional information/data corresponding to the user's vendor affiliation. In various embodiments, the user registration tool 501 may be configured to receive vendor identity information/data identifying the vendor with which the user is affiliated (e.g., the user's employer). Upon receipt of the vendor identity information/data corresponding to a user, the user registration tool 501 may be configured to determine whether the vendor has previously registered with the commodity/item procurement system 400. As will be described in greater detail herein, upon a determination that the vendor has not previously registered with the commodity/item procurement system 400, the registration module 500 and/or vendor module 600 may be configured to receive additional vendor identity information/data in order to enroll/register the vendor with the commodity/item procurement system 400. Upon a determination that the vendor has previously been registered with the commodity/item procurement system 400, the user registration tool 501 may be configured to associate the user with an appropriate vendor identifier.

In various embodiments, the user registration tool 501 may be configured to generate and store a user profile for the user. Accordingly, the user registration tool 501 may be configured to create and store various user profiles (e.g., store consumer and vendor profiles via the database 450). In addition to at least the information/data described above, a user profile may comprise one or more corresponding usernames, passwords, and/or other credentials for accessing the profiles. Additionally, the user registration tool 501 may be configured to generate a user identifier in association with the user profile. The user identifier may also be stored in association with a vendor identifier for the vendor with which the user is affiliated (e.g., the user's employer). As described herein, the user profile may comprise information/data indicative of a particular user's information/data access privileges, a user's preferences, personal notes saved to various information/data records, and/or the like. The information/data stored in the user profile may thus be utilized to generate a graphical user interface (GUI) for display to the user upon the user logging into the commodity/item procurement system via an application, browser, user interface, dashboard, webpage, and/or similar words herein interchangeably executing on the corresponding entity/device. For example, the commodity/item procurement system may compare the information/data stored in the user's profile against the total information/data stored in association with the commodity/item procurement system, and may provide a GUI to the user providing only that information/data for which the user has been given access. Moreover, the GUI may be generated to comply with one or more user preferences, and may display one or more notes or other user-specific information/data features as specified in the information/data stored in association with the user's profile.

The registration module 500 may additionally comprise a vendor registration tool 502 configured to register one or more vendors with the commodity/item procurement system 400. In various embodiments, the vendor registration tool 502 may be configured to register one or more vendors upon receipt of a user input requesting vendor registration. Alternatively, the vendor registration tool 502 may be configured to register the one or more vendors upon a determination that a vendor user is affiliated with a vendor not previously registered with the commodity/item procurement system 400. The vendor registration tool 502 may be configured to receive vendor biographic and/or geographic information/data as a user input (e.g., via a registration user interface). For example, the vendor registration tool 502 may receive information/data indicative of the vendor's name, such as a company name, an entity name, a franchise name, and/or an organization name. The vendor registration tool 502 may be configured to receive one or more addresses associated with the vendor (e.g., street address, city, state, postal code, and/or country), and may receive information/data indicative of an exact location of the vendor location (e.g., GPS coordinates). For example, a representative of the vendor may utilize a graphical user interface displaying a map to indicate the exact location of the vendor location on the map. The vendor registration tool 502 may be configured to receive information/data regarding the type of commodities/items available for procurement from the vendor, as well as how the vendor offers these commodities/items (e.g., for lease, for purchase, hourly, by job completion, and/or the like). Moreover, the vendor registration tool 502 may be configured to receive additional information/data associated with the vendor, such as (1) the name of a primary contact at the vendor, (2) a subunit of the vendor with which the consumer would contact, (3) a consumer vendor identifier, (4) vendor contact information/data (e.g., one or more vendor phone numbers, facsimile numbers, email addresses, and/or the like), (5) effective dates of vendor relationship (e.g., the time period during which the consumer has agreed to contact the vendor regarding needed commodities/items), and/or the like.

In various embodiments, the vendor registration tool 502 may be configured to generate and store a vendor profile for the vendor. Accordingly, the vendor registration tool 502 may be configured to create and store various vendor profiles (e.g., via one or more storage media) for one or more vendors. In addition to at least the information/data described above, a vendor profile may comprise one or more corresponding usernames and passwords each corresponding to a particular registered user associated with the vendor. Additionally, the vendor registration tool 502 may be configured to generate a vendor identifier in association with the vendor profile. The vendor identifier may also be stored in association with a user identifier for the one or more users with which the vendor is affiliated (e.g., the user's employer). As described herein, each vendor profile may comprise information/data indicative of a particular vendor's (or a user account associated with the vendor) information/data access privileges, a vendor's preferences, personal notes saved to various information/data records, and/or the like. The information/data stored in the vendor profile may thus be utilized to generate a GUI for display to the vendor upon a representative of the vendor logging into the commodity/item procurement system via an application, browser, user interface, dashboard, webpage, and/or similar words herein interchangeably executing on the corresponding entity/device. For example, the commodity/item procurement system may compare the information/data stored in the vendor's profile against the total information/data stored in association with the commodity/item procurement system, and may provide a GUI to the vendor providing only information/data associated with that vendor (e.g., information/data indicative of commodities/items available from the vendor, information/data indicative of pricing offered by the vendor, and/or the like). Moreover, the GUI may be generated to comply with one or more vendor preferences, and may display one or more notes or other user-specific information/data features as specified in the information/data stored in association with the user's profile.

As illustrated in FIG. 5, the registration module 500 may additionally comprise a consumer location registration tool 503 configured to receive and store consumer location information/data indicative of the various regional consumer locations. In various embodiments, the consumer location information/data may comprise one or more addresses associated with each regional consumer location. In various embodiments, the consumer location registration tool 503 may be configured to generate and store a consumer location profile for the regional consumer location. Accordingly, the registration module 500 may be configured to create and store various consumer location profiles (e.g., via the database 450). Additionally, the registration module 500 may be configured to generate a consumer location identifier in association with the consumer location profile. The consumer location identifier may be stored in association with a user identifier for the one or more users with which the consumer location is associated (e.g., IE users and/or RECs). For example, the consumer location registration tool 503 may be utilized to update information/data about one or more consumer locations, to add new consumer locations corresponding to previously unregistered locations (e.g., a newly established location), and/or the like.

2. Vendor Module

Referring again to FIG. 5, the commodity/item procurement system 400 may additionally comprise a vendor module 600. The vendor module 600 may be configured to receive and store information/data corresponding to a plurality of commodity/item leasing vendors, such as national commodity/item leasing vendors and/or regional/local commodity/item leasing vendors. The vendor module 600 is configured to execute one or more tools to facilitate the receipt of RFPs generated and transmitted from a consumer module 700 by a vendor. As previously indicated, vendor users may be granted access to at least a portion of the information/data associated with the vendor module 600. In various embodiments, vendor users may be granted access to only that portion of the vendor module 600 corresponding to the vendor with which the user is affiliated (e.g., the user's employer). In various embodiments, the vendor module 600 may be configured to generate one or more GUIs to enable vendor users to view, edit, and/or add information/data to the vendor module 600. As described herein, each GUI may be generated to provide information/data to a vendor user corresponding to the information/data stored in a vendor profile.

In various embodiments, the GUI may define a dashboard providing information/data to a vendor user regarding various activities of the vendor. For example, the dashboard may provide information/data indicative of outstanding RFPs received from the consumer, bids/responses provided previously by the vendor, the availability of commodities/items offered by the vendor, a vendor score provided by the consumer and indicative of performance metrics measured by the vendor, and/or the like.

In various embodiments, the vendor module 600 may additionally comprise a vendor communication interface 601. The vendor communication interface 601 may be configured to transmit and receive communications from at least the consumer module 700. In various embodiments, the vendor communications interface 601 may be configured to transmit and receive communications in a variety of formats, such as email, SMS, MMS, and/or the like. Moreover, the vendor communications interface 601 may be configured to transmit and receive information/data from the consumer module 700 via other communications formats. The vendor communications interface 601 may be configured to transmit bids/responses to the consumer module 700 and receive RFPs, bid/response acceptance information/data and/or bid/response rejection information/data from the consumer module 700. Moreover, the vendor communications interface 601 may be configured to receive and transmit other correspondence between users (e.g., questions and answers communicated between one or more consumer users and one or more vendor users).

The vendor module 600 may additionally comprise a capacity tool 602 configured to receive and store information/data regarding each vendor's available commodities/items. The capacity tool 602 may be configured to receive and store vendor capacity information/data and vendor contract information/data indicative of available commodities/items and contractually agreed-upon pricing. For example, the capacity tool 602 may comprise an Application Program Interface (API) configured to obtain information/data from a vendor system (e.g., an internal computer system operated by a vendor, such as vendor computing entity 110) and store the information/data in association with the vendor. For example, the API may be configured to receive vendor capacity information/data indicative of the type of commodities/items available from the vendor, the location of the commodities/items available from the vendor (e.g., if the vendor has multiple locations and/or to indicate whether the commodities/items are currently located at one or more vendor locations or currently in the possession of another customer (e.g., another lease customer)), the quantity of commodities/items available from the vendor, the dates and/or times the commodities/items are available from the vendor, known pricing of commodities/items offered by the vendor, and/or the like. In various embodiments, the API may be configured to obtain real-time vendor information/data indicative of the current inventory of commodities/items and/or the current availability of various employees/personnel of the vendor, such that the vendor information/data is indicative of current availability as well as future reservations of commodities/items and/or professionals employed by the vendor. Thus, the vendor information/data is indicative of when various commodities/items are available from the vendor in the future. As a non-limiting example, the vendor capacity information/data may indicate that Vendor A has 15 delivery vehicles available for lease at a Fort Lauderdale, Fla., vendor location. In various embodiments, the capacity tool 602 may receive vendor capacity information/data automatically from the vendor. As an additional example, the vendor capacity information/data may indicate that Vendor A typically only stocks delivery vehicles for least at the Fort Lauderdale, Fla., vendor location, however, during a particular period of time, the vendor location has a tractor-trailer available for lease (e.g., due to an unanticipated one-way delivery to the vendor location). Alternatively, the capacity tool 602 may receive vendor capacity information/data as a user input from a vendor user (e.g., via one or more fillable forms available to the vendor user via the GUI).

In various embodiments, the vendor capacity data may correspond to availability information/data stored on a vendor system, such as vendor computing entity 110, that the vendor utilizes for internal sales and/or lease reservations. Accordingly, the vendor capacity data may be generated based on user input by a vendor user during typical employment duties (e.g., customer checkout, reservation confirmation, and/or the like). However, in various embodiments, the vendor capacity data may be generated automatically based at least in part on data generated based on location sensors located on commodities/items. Accordingly, upon determining that the location sensors on each of the commodities/items are within a predefined area (e.g., with a predefined distance from a vendor location, within a user defined geofence around the vendor location, and/or the like), the vendor capacity data may indicate that the one or more commodities/items are available. In yet other embodiments, the vendor capacity data may be generated based at least in part on user input and on automatically generated sensor data. For example, the vendor capacity data may be indicative of upcoming reservations for commodities/items currently located within a predefined distance from a vendor location. Thus, commodities/items that may currently be located at (or near) a vendor location, but are scheduled to be unavailable in the near future, may be indicated as unavailable. In various embodiments, information obtained from vehicle sensors may be first conveyed to a vendor computing entity 110, and then may be relayed to the capacity tool 602.

By utilizing information obtained from a vendor computing entity 110 to populate the vendor capacity data, information/data indicative of a vendor's capacity is provided in real-time such that the capacity tool 602 considers all of the vendor's currently available commodities/items during further processing. For example, in various embodiments, upon a consumer generating a request for commodities/items, the capacity tool 602 is configured such that only those vendors that are able to accommodate the consumer's request may provide bids. Thus, vendors are not unnecessarily inundated with requests for commodities/goods they cannot fulfill, and the consumer is prevented from receiving one or more bids from vendors that cannot fill the consumer's request. Accordingly, in various embodiments, such embodiments significantly reduce the required computing capacity of the associated computing entities (e.g., the vendor computing entity 110, and/or the consumer computing entity 100) due to the reduced number of requests transmitted there between.

As indicated herein, the capacity tool 602 may additionally receive vendor contract information/data indicative of the terms of a pricing agreement between a vendor and the consumer. In various embodiments, the vendor contract information/data may be received as user input by a consumer user and/or a vendor user. The vendor contract information/data may be associated with a particular vendor identifier such that the vendor contract information/data is accessible by consumer users and/or vendor users affiliated with the vendor.

In various embodiments, the vendor module 602 may comprise a consumer-as-vendor tool 603 configured to receive and store information/data regarding the cost to relocate consumer-owned and/or operated commodities/items (e.g., vehicles and/or employees/personnel) in order to fulfill the commodity/item need of a particular consumer location. Thus, the consumer-as-vendor tool 603 may facilitate a determination whether procuring commodities/items for short periods of time is more cost effective than temporarily and/or permanently relocating consumer-operated commodities/items and/or employees/personnel in order to fulfill the commodity/item need. In various embodiments, the consumer-as-vendor tool 603 may receive information/data indicative of the current location of consumer-operated commodities/items. Moreover, the consumer-as-vendor tool may additionally receive additional information/data indicative of the cost and/or time required to relocate the commodities/items and/or employees/personnel to another location.

3. Consumer Module

Figure 7:
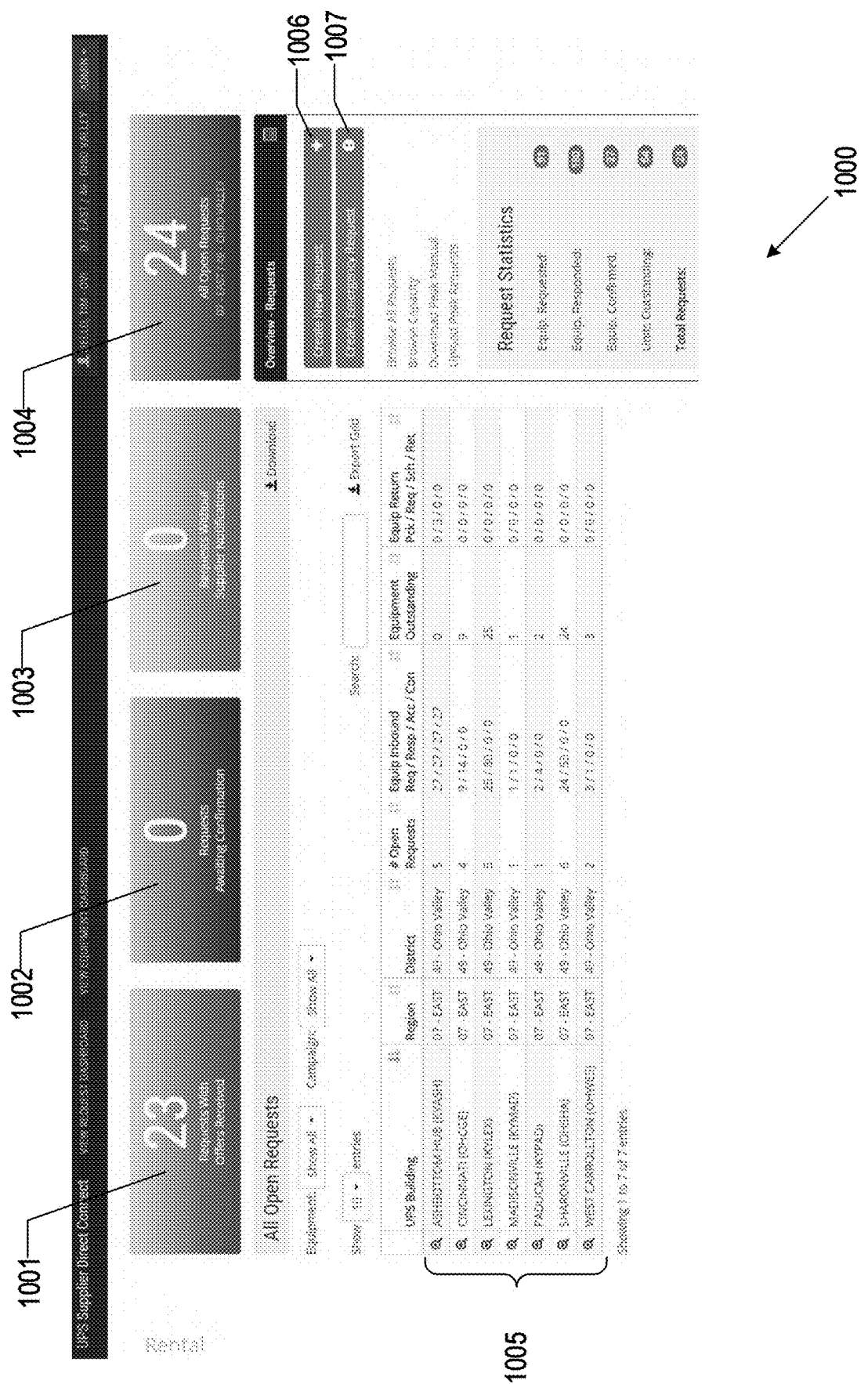
FIG. 7 is an example user interface presented to a consumer user.

Referring again to FIG. 5, the commodity/item procurement system 400 may additionally comprise the consumer module 700. The consumer module 700 is configured to execute one or more tools to facilitate an identification of consumer commodity/item needs and to facilitate contact with vendors in order to procure commodities/items to meet the identified needs. As previously indicated, consumer users may be granted access to at least a portion of the information/data associated with the consumer module 700, for example, via a GUI generated in conformance with information/data stored in association with a user profile associated with the consumer user. In various embodiments, the consumer module may be configured to generate one or more GUIs to enable consumer users to view, edit, and/or add information/data to the consumer module. For example, as shown in FIG. 7, which provides an example user interface 1000 that may be displayed to a consumer user, the GUI may provide a dashboard indicative of various statistics associated with the one or more consumer locations associated with the user. For example, the dashboard may comprise one or more status indicators 1001-1004 indicative of the outstanding RFPs generated by a representative of the consumer 1004 (which may be the user or another user associated with one or more consumer locations), RFPs having outstanding bids/responses received by various vendors 1001, outstanding reservations requiring additional input by a representative of the consumer 1002, RFPs that have no outstanding bids/responses 1003, and/or the like. Moreover, the GUI may provide users with one or more options for filtering various information/data records such that only those information/data records matching filtering criteria are shown (e.g., by clicking on one of the status indicators 1001-1004). As will be described in greater detail herein, the GUI may provide one or more options permitting a user to initiate a new RFP to be provided to various vendors.

In various embodiments, the consumer module 700 may comprise a needs tool 702 configured to receive commodity/item need information/data indicative of the consumer's need of various commodities/items. For example, the commodity/item needs information/data may be indicative of various pieces of equipment needed during a particular period of time in order to meet business requirements. The commodities/items need information/data may comprise (1) emergency need information/data and (2) planning data. Emergency need information/data may comprise information/data identifying an immediate need for commodities/items. Emergency need information/data may be received as user input from various users (e.g., RECs or other consumer users associated with one or more regional consumer locations). As a non-limiting example, a REC may input emergency need information/data upon a determination that a particular regional location is in need of 10 additional tractor-trailers in order to meet shipping requirements for the following 7 days. In various embodiments, the need tool 702 may be configured to receive emergency need information/data from only a subset of the total number of consumer users, such as those users associated with a small number of regional consumer locations (e.g., less than 5 regional consumer locations). Alternatively, the need tool 702 may be configured to receive emergency need information/data from all consumer users.

Planning information/data may comprise information/data indicative of an anticipated need of various commodities/items. In various embodiments, planning information/data may comprise information/data indicative of anticipated usage of commodities/items (e.g., equipment usage and/or temporary employee need). Such planning information/data may comprise historical usage information/data and/or regional fleet data. Historical usage information/data may comprise information/data regarding the type and quantity of commodities/items utilized at each regional consumer location at various historical points in time. As a non-limiting example, historical usage information/data for a particular regional consumer location for a common-carrier may indicate that 101 delivery vehicles were utilized at the regional consumer location on Dec. 22, 2013. Regional fleet information/data may comprise information/data indicative of the type and amount of consumer-operated commodities/items at a particular regional consumer location. As a non-limiting example, regional fleet information/data for a particular regional consumer location may indicate that 50 delivery vehicles and 25 tractor-trailers are currently located at the regional consumer location. In various embodiments, the consumer module 700 may be configured to receive planning information/data from only a subset of the total number of consumer users, such as those users responsible for a large number of regional consumer locations (e.g., IE users responsible for all regional consumer locations in the United States). Alternatively, the need tool 702 may be configured to receive planning information/data from all consumer users.

In various embodiments, the need tool 702 may be configured to determine, based at least in part on the planning data, the anticipated need of commodities/items for each regional consumer location. As a non-limiting example, the consumer module 700 may be configured to determine that, based on the number of delivery vehicles at a particular regional consumer location and the number of delivery vehicles historically utilized on December 23, that the consumer will likely need to lease an additional 11 delivery vehicles for use by the regional consumer location on that date in the future.

Upon a determination of the number and type of pieces of equipment needed to be leased, the consumer module 700 may be configured to execute one or more tools to facilitate the procurement of the needed equipment. In various embodiments, the consumer module 700 may be configured to execute a vendor identification tool 703 configured to identify vendors meeting predetermined requirements for leasing the needed equipment to the consumer. The vendor identification tool 703 may be configured to receive vendor capacity information/data and vendor contract information/data for one or more vendors from the vendor module 600. Based at least in part on the vendor capacity information/data and the vendor contract data, the vendor identification tool 703 may be configured to identify one or more vendors to whom RFPs may be transmitted.

In various embodiments, the consumer module 700 may additionally comprise a consumer communication interface 701. The consumer communication interface 701 may be configured to transmit and receive communications from at least the vendor module 600. In various embodiments, the consumer communications interface 701 may be configured to transmit and receive communications in a variety of formats, such as email, SMS, MMS, and/or the like. Moreover, the consumer communications interface may be configured to transmit and receive information/data from the vendor module 600 via other communications formats. The consumer communications interface 701 may be configured to transmit RFPs and/or bid/response acceptance correspondence to one or more vendors and receive bid/response correspondence from the one or more vendors. Moreover, the consumer communications interface 701 may be configured to receive and transmit other correspondence between users (e.g., questions and answers communicated between one or more consumer users and one or more vendor users).

The consumer module 700 may also comprise a RFP tool 704 configured to generate and transmit, via the consumer communications interface 701, one or more RFPs to one or more vendors. Accordingly, the RFP tool 704 may be configured to retrieve the contact information/data associated with each vendor selected to receive an RFP from the database containing information/data corresponding to the plurality of vendors. In various embodiments, the vendor identification tool 703 may be configured to transmit information/data identifying the one or more vendors to whom RFPs may be transmitted to the RFP tool 704. The RFP tool 704 may then generate one or more RFPs requesting each identified vendor to provide information/data regarding the commodities/items that may be available for procurement. Upon identification of one or more vendors to whom RFPs are to be sent, the RFP tool 704 may be configured to enable RFP features to be available to vendor users. For example, upon a vendor being selected to receive an RFP, the GUI associated with the vendor may provide vendor users with access to features to respond to the RFP via the GUI provided to the vendor by the vendor module 602. For example, the RFP tool 704 may be configured to update the vendor profile associated with each selected vendor to reflect that the vendor is given access to the corresponding feature enabling each vendor to respond. Upon determining/identifying that the vendor has been selected to receive an RFP, the vendor module 602 may be configured to update the GUI to be displayed to vendor users associated with the vendor to reflect that the vendor has been identified to provide a bid/response in response to the RFP.

Moreover, the RFP tool 704 may be configured to associate one or more deadlines with each of the one or more RFPs. As a non-limiting example, upon a determination that an RFP is to be generated in response to the receipt of emergency need information/data, the RFP tool 704 may be configured to set a response deadline of 1 hour for the RFP. Thus, vendors desiring to submit a bid/response in response to the RFP must respond within 1 hour of generation of the RFP. As indicated, the RFP tool may also be configured to transmit the one or more RFPs to the one or more vendors via the communications interface.

The consumer module 700 may additionally comprise a bid/response tool 705 configured to receive bid/response information/data from the one or more vendors. In various embodiments, the bid/response information/data may comprise information/data indicative of bids/responses provided by one or more vendors. The bid/response information/data may comprise information/data indicative of the type of equipment that may be provided to the consumer, the amount of each type of commodities/items that may be provided to the consumer, the cost associated with procuring the commodities/items, an anticipated time of delivery of the commodities/items, and/or the like. In various embodiments, the bid/response tool 705 may be configured to determine, based at least in part on the bid/response information/data corresponding to each vendor's bid, at least one vendor bid/response to be selected. Alternatively, the bid/response tool may be configured to receive user input from at least one consumer user selecting a vendor bid.

In various embodiments, the bid/response tool 705 may be configured to generate and transmit one or more bid/response acceptance communications to the one or more vendors who submitted bids. The bid/response acceptance communications may be configured to notify the one or more vendors regarding the current status of their bid. For example, a first bid/response acceptance communication transmitted to Vendor A may notify Vendor A that its submitted bid/response was rejected, and a second bid/response acceptance communication transmitted to Vendor B may notify Vendor B that its submitted bid/response was accepted. In various embodiments, upon one or more bids/responses being accepted, the bid/response tool 705 may be configured to automatically notify all vendors that submitted bids/responses regarding the status of their bid.

The bid/response tool 705 may additionally be configured to receive commodity/item need information/data in order to determine whether the vendor bid/response to be selected fulfills the entirety of the commodity/item needs identified in the need information/data. In various embodiments, upon a determination that the vendor bid/response does not fulfill the commodity/item needs identified in the need information/data, the bid/response tool 705 may be configured to transmit information/data to the RFP tool 704 indicating that additional commodities/items are still needed in order to fulfill the commodity/item needs identified in the need information/data. In response, the RFP tool 704 may be configured to generate and transmit one or more supplemental RFPs to one or more vendors in order to solicit additional bids/responses to fulfill the remaining commodity/item needs. The bid/response tool 705 may thus be configured to receive supplemental bid/response information/data from one or more vendors. In various embodiments, the supplemental bid/response information/data may comprise information/data indicative of bids/responses provided by one or more vendors in response to the supplemental RFP. The supplemental bid/response information/data may comprise information/data indicative of the type of commodities/items that may be provided to the consumer, the amount of each type of commodities/items that may be provided to the consumer, the cost associated with procuring the commodities/items, an anticipated time of delivery of the commodities/items, and/or the like. In various embodiments, the bid/response tool 705 may be configured to determine, based at least in part on the supplemental bid/response information/data corresponding to each vendor's supplemental bid, at least one supplemental vendor bid/response to be selected. Alternatively, the bid/response tool 705 may be configured to receive user input from at least one consumer user selecting a supplemental vendor bid.

In various embodiments, the bid/response tool 705 may be configured to generate and transmit one or more supplemental bid/response acceptance communications to the one or more vendors who submitted supplemental bids. The bid/response acceptance communications may be configured to notify the one or more vendors regarding the current status of their supplemental bid, as indicated above.

The bid/response tool 705 may additionally be configured to receive need information/data in order to determine whether the combination of the selected vendor bid/response and the selected supplemental vendor bid/response (the "combined bid") fulfills the entirety of the commodity/item needs identified in the equipment need information/data. In various embodiments, upon a determination that the combined bid/response does not fulfill the commodity/item needs identified in the need information/data, the bid/response tool 705 and/or the RFP tool 704 may be configured to repeat the supplemental bidding process discussed above.

Moreover, in considering vendor bids/responses and/or vendor supplemental bids, the bid/response tool 705 may additionally be configured to consider submitted bids/responses from the consumer-as-vendor tool 603. As discussed herein, the consumer-as-vendor tool 603 may be configured to generate one or more commodity/item relocation bids/responses based at least in part on the cost and time required to temporarily and/or permanently relocate one or more pieces of consumer-owned and/or operated commodities/items and/or employees/personnel in order to fulfill the identified commodity/item need. Thus, in determining/identifying whether to lease equipment from a vendor or to relocate consumer-owned and/or operated commodities/items and/or employees/personnel, the bid/response tool 705 may be configured to compare one or more bids/responses submitted by one or more vendors and one or more relocation bids/responses generated by the consumer-as-vendor tool 603.

4. Reporting Module

In various embodiments, the commodity/item procurement system 400 may additionally comprise a reporting module 800 configured to receive information/data from the registration module 500, the vendor module 600, and/or the consumer module 700. The reporting module 800 may comprise a reporting tool 801 configured to generate and store one or more information/data reports for one or more users. In various embodiments, the reporting module 800 may be configured to generate one or more spending reports indicative of the amount of funds expended on commodities/items for a defined subset of data. As a non-limiting example, the reporting module 800 may be configured to generate one or more rental spending reports indicative of the amount of funds expended on equipment leases for one or more identified regional consumer locations and/or over a predefined period of time. Moreover, the reporting module 800 may be configured to generate one or more reports indicative of the vendors utilized for equipment rental needs. As a non-limiting example, the reporting module 800 may be configured to generate one or more reports comprising information/data indicative of the vendors utilized for equipment leasing needs by one or more identified regional consumer locations and/or over a predefined period of time.

Exemplary Method of Use

Figure 6:
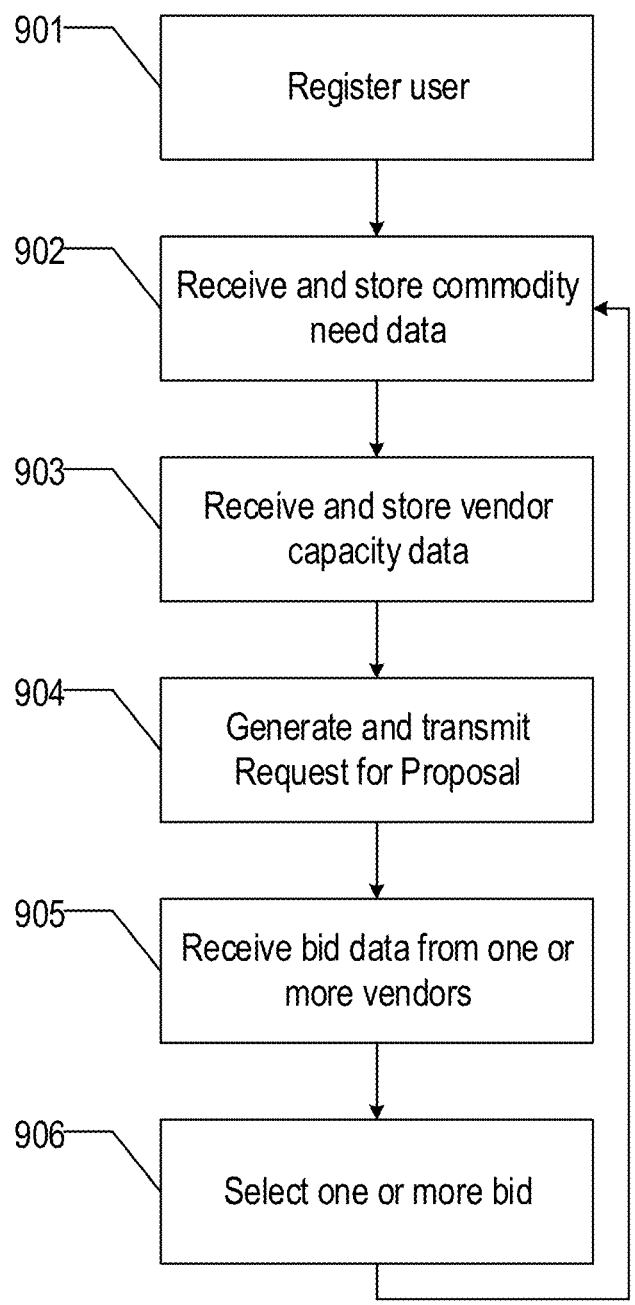
FIG. 6 is a flowchart illustrating exemplary methods for procuring leased equipment according to various embodiments of the present invention.

Reference will now be made to FIG. 6, which is a flowchart illustrating operations and processes that may be performed for equipment lease procurement.

1. Registration

In various embodiments, as indicated in Block 901 of FIG. 6, the process may begin with the enrollment/registration of one or more users with a commodity/item procurement system 400. As previously indicated, a user may be an individual, a company, an organization, an entity, a department within an organization, a representative of an organization and/or person, and/or the like. To register, a user (e.g., a user or user representative operating a user computing device 110) may access a webpage or other interface of a consumer, such as United Parcel Service of America, Inc. (UPS). For instance, the consumer system 100 may transmit a webpage that provides the user with an option of logging into a user account or enrolling/registering with the commodity/item procurement system 400.

In various embodiments, as part of the enrollment/registration process, the user may be determined to be a consumer user associated with the consumer (e.g., a consumer employee) and/or a vendor user associated with one or more vendors (e.g., a vendor employee). In various embodiments, such determination may be made based at least in part on the user computing device 110 utilized to register (e.g., by determining/identifying whether the device is associated with the consumer), or may be made based on user input.

Moreover, as a part of the enrollment/registration process, the user (e.g., a user or user representative operating a user computing device 110) may be requested to provide biographic and/or geographic information/data by the consumer system 100 (e.g., via the user registration tool 501). For example, the user may provide the user's name, such as a first name, a last name, a company name, an entity name, an organization name, and/or the like. The user may also provide one or more addresses (e.g., street address, city, state, postal code, and/or country) and/or facilities (e.g., one or more regional consumer locations) associated with the user. As indicated, the user may have multiple addresses and/or facilities associated with the account. For example, a consumer user may be associated with 3 separate regional consumer locations each having a different address. When multiple addresses are provided, the user may indicate which address should be used as the primary address. As will be recognized, the user may provide other biographic and/or geographic information/data to adapt to various needs and circumstances.

In various embodiments, a user may be required to provide different information/data depending at least in part on the determination of whether the user is a consumer user or a vendor user. For example, a vendor user may be required to provide additional information/data regarding an associated vendor (e.g., vendor name, vendor location, type of equipment available for lease by the vendor, and/or the like).

In various embodiments, the consumer system 100 may create a user profile for the user via the enrollment/registration process. Accordingly, the consumer system 100 may create and store various user profiles (e.g., via database 450). In addition to at least the information/data identified above, a user profile may include one or more corresponding usernames and passwords. Additionally, the consumer system 100 may also create and store a user identifier in association with the user profile. In various embodiments, a user identifier may be used to uniquely identify a user profile.

Moreover, upon a determination that an identified vendor has not enrolled/registered, the registration process may additionally comprise steps for enrolling/registering the vendor. As previously indicated, as a part of the process for enrolling/registering the vendor, a user (e.g., a user or user representative operating a user computing device 110) may provide biographic and/or geographic information/data by the consumer system 100 (e.g., via the vendor registration tool 502). For example, the user may provide the vendor's name, such as a company name, an entity name, and/or an organization name. The user may also provide one or more addresses associated with the vendor (e.g., street address, city, state, postal code, and/or country). As indicated, the vendor may have multiple addresses associated with the account. For instance, Vendor A may have 2 or more locations from which commodities/items may be procured. As will be recognized, the user may provide other biographic and/or geographic information/data to adapt to various needs and circumstances. For example, a user may provide information/data regarding the types of commodities/items available from each of the vendor's one or more locations. In various embodiments, the vendor may select from a pre-populated list of possible commodities/items that may be offered by the vendor. Such pre-populated list may correspond to types of commodities/items historically needed by a consumer, types of commodities/items corresponding to a particular piece of equipment (e.g., vehicle parts for one or more types of vehicles), and/or the like. By providing vendors with a pre-populated list of potential commodities/items to be offered by the vendor, information/data indicative of the types of commodities/items offered by the vendors may be standardized across a plurality of vendors in order to facilitate an identification of the types of commodities/items offered by various vendors, and to facilitate a comparison between commodities/items offered by various vendors. For example, the vendor registration tool may provide a list of possible equipment that may be available for lease from various vendors including (1) Enclosed Trailer, (2) ¾ Ton Truck, (3) 12' to 18' Box Truck, (4) 24' Van, and/or the like. As yet another alternative, the vendor registration tool may provide a list of possible services that may be available for purchase from various vendors including: (1) Vehicle Transmission Repair, (2) Vehicle Interior Detailing, (3) Vehicle Engine Repair, (4) Exterior Collision Repair, and/or the like.

In various embodiments, a vendor may indicate the types of commodities/items available from the vendor by correlating one or more of the pre-populated list entries with a particular internal vendor system entry via an API. Such configuration may permit a vendor computing system to automatically update the types of commodities/items available from a vendor location without needing to manually update the information/data stored in association with the vendor profile associated with the vendor location. For example, equipment operated and made available for lease by equipment lease vendors (e.g., vehicle lease vendors) may move between a plurality of equipment lease vendor locations due to customer one-way leases, movement of inventory between locations, and/or the like. Accordingly, an internal vendor system tracking inventory levels at each vendor location may be configured to provide inventory information/data to the vendor module 600 (e.g., via the API) to provide detailed inventory information/data to the commodity/item procurement system 400. The internal vendor system may correlate internal commodities/items reference indicators with those provided in the pre-populated list of the commodity/item procurement system 400, such that the internal vendor system may provide updated inventory information/data to the commodity/item procurement system 400 automatically based on changes to inventory levels tracked by the internal vendor system. For instance, if the commodity/item level at a particular vendor changes, the system can be updated in real time regarding the change.

In various embodiments, representatives from each location for a vendor may register separately, such that each vendor location may be associated with a separate vendor profile. In such instances, the vendor profiles associated with each of the individual vendor locations may be linked, such that all vendor profiles corresponding to individual locations of a single vendor may be associated. For example, each local franchise of Vendor A may register separately for an individual vendor profile. However, all vendor profiles corresponding to individual franchises of Vendor A may be linked. In various embodiments, one or more vendor users (e.g., an industrial engineering vendor user) may have access to information/data associated with all of the individual vendor profiles associated with each individual vendor location. In such embodiments, vendor information/data associated with a first vendor location may not be available to users only associated with a second vendor location.

In various embodiments, the consumer system 100 may create a vendor profile for the vendor via the enrollment/registration process. Accordingly, the consumer system 100 may create and store various vendor profiles (e.g., via database 450). In addition to at least the information/data identified above, a vendor profile may include one or more corresponding usernames and passwords. Additionally, the consumer system 100 may also create and store a vendor identifier in association with the vendor profile. In various embodiments, a vendor identifier may be used to uniquely identify a vendor profile.

In various embodiments, once a user profile and/or a vendor profile has been created by the consumer system 100, the user (e.g., a user or user representative operating a user computing device 110) can provide various preferences associated with the user profile and/or vendor profile to the consumer system 100 via a webpage, for example.

The enrollment/registration process may additionally comprise steps for receiving information/data for one or more regional consumer locations. As a part of the enrollment/registration process, the user (e.g., a consumer user operating a user computing device 110) may provide biographic and/or geographic information/data to the consumer system (e.g., via the consumer location registration tool 503). For example, the user may provide one or more addresses for the regional consumer location (e.g., street address, city, state, postal code, and/or country). By receiving information/data regarding the location of each of the one or more regional consumer locations, the commodity/item procurement system 400 may be configured to determine the distance between each regional consumer location and one or more vendor locations. Moreover, the commodity/item procurement system 400 may be configured to determine the distance between each regional consumer location in order to determine an anticipated time and/or cost associated with moving equipment from a first regional consumer location to a second regional consumer location.

2. Commodities/Items Need Determination

Referring again to FIG. 6, as indicated at Block 902, the process may continue by receiving and storing need information/data. In various embodiments, the need information/data may be received by consumer module 700 and may be stored in one or more storage media (e.g., database 450). Need information/data may be provided as a user input (e.g., from at least one consumer user operating a user computing device 110), or may be provided automatically from the consumer module 700. The need information/data may identify one or more regional consumer locations in need of additional commodities/items during a particular period of time, and may identify the type and quantity of additional commodities/items needed. For example, during periods of increased parcel shipment, one or more regional consumer locations associated with a common carrier may require additional delivery vehicles in order to deliver every parcel to intended recipients. Thus, the need information/data may be provided in response to a determination that historically one or more regional consumer locations for the common carrier will need additional equipment during a predetermined period of time.

Alternatively and/or additionally need information/data may be provided in response to a determination that unforeseeable circumstances have arisen that require additional commodities/items at a particular consumer location. As a non-limiting example, a consumer user associated with a common carrier may determine that a particular day has an unforeseeably high volume of parcels that must be delivered, and therefore additional parcel delivery vehicles are required in order to meet business needs. As another non-limiting example, a consumer user may determine that one or more consumer-owned pieces of equipment has become non-operational, and therefore one or more pieces of equipment must be leased in order to meet business needs while the consumer-owned equipment is being repaired.

3. Vendor Capacity Determination

As indicated at Block 903 of FIG. 6, the process may continue by receiving and storing vendor capacity information/data indicative of the amount and type of commodities/items that may be leased from each of one or more vendors. In various embodiments, the vendor capacity information/data may be received by the vendor module 600 and may be stored in one or more storage media (e.g., database 450).

Vendor capacity information/data may be provided as a user input (e.g., from at least one vendor user operating a user computing device 110), or it may be provided automatically from the vendor module 600 (e.g., via an API obtaining information/data regarding the vendor's capacity from a vendor-provided system). The vendor capacity information/data may identify one or more types of commodities/items available from one or more vendors, and may identify the amount of each type of commodities/items available from the one or more vendors. As previously indicated, the one or more vendor locations may be associated with each of the one or more vendors, and therefore the vendor capacity information/data may be indicative of the location of each good (e.g., piece of equipment) available from the one or more vendors.

In various embodiments, the vendor capacity information/data may be updated periodically, continuously, and/or in response to certain triggers to reflect the current commodities/items available from the one or more vendors. In various embodiments, the vendor capacity information/data may be updated automatically via "pushed" information/data provided to the vendor module 600 from one or more vendor computing devices 110 associated with the vendor (e.g., via the API), and/or from one or more other vendor computing devices and computing systems. For example, the vendor capacity information/data may indicate that a particular vendor location has 100 delivery vehicles that may be leased from that location, and may indicate that currently 40 delivery vehicles have already been leased and are therefore unavailable. As discussed herein, the vendor capacity information/data may be generated based at least in part on user input (e.g., indicative of one or more upcoming reservations for commodities/items), based at least in part on automatically generated vehicle location sensor data (e.g., indicative of the current location of a vehicle), and/or the like. Thus, the vendor capacity information/data corresponds to information/data stored in the vendor computing devices 110 and utilized by the vendor for facilitating purchases and/or other procurement of the commodities/items.

Moreover, as previously indicated, the vendor capacity information/data may additionally comprise information/data indicative of any contractual relationships between the consumer and the vendor. For example, the vendor capacity information/data may comprise information/data indicative of contractual lease pricing agreements between the consumer and the vendor including agreed upon pricing for leasing particular commodities/items. Alternatively or additionally, the vendor capacity information/data may comprise additional information/data indicative of the cost to lease a piece of equipment from the vendor.

In various embodiments, at least a portion of the vendor capacity information/data may be made available to one or more consumer users. For example, when selecting one or more vendors from whom to procure various commodities/items, a consumer user may compare the type of commodities/items available from each vendor location, the distance between each vendor location and the regional consumer location in need of the commodities/items, the price to procure the commodities/items, and/or other information/data that may be included in the vendor capacity data. For example, as will be described in greater detail herein, the consumer users may be provided within information/data indicative of various performance metrics for each vendor location (e.g., response time, commitment, fulfillment, service, quality, and/or the like). For example, the consumer users may be presented with a performance score for each vendor location based on information/data indicative of the various performance metrics, and/or the vendor locations may be presented in a hierarchical list organized based on the relative performance scores for each vendor location. As discussed herein, the performance scores may be determined based on response time for responding to RFPs, price, distance from a consumer location, quality of commodities/items historically provided, and/or the like.

4. Request for Proposals

Referring again to FIG. 6, the process may continue at Block 904 by generating and transmitting one or more RFPs. In various embodiments, a RFP may be generated by the consumer module 700 in order to solicit bids/responses from one or more vendors for procuring commodities/items. The RFP may indicate the type of commodity/item needed, the location where the commodities/items is needed, a maximum price the consumer is willing to pay to procure the commodities/items, a time and/or date when the commodities/items are needed (e.g., beginning time and/or end time), and/or the like. Moreover, the RFP may indicate a deadline for responding to the RFP (e.g., one hour after transmission of the RFP). As previously indicated, the deadline for responding to the RFP may be determined based at least in part on the type of commodity/item need information/data provided (e.g., planning information/data or emergency need information/data).

Moreover, the process for generating a RFP may additionally comprise steps for determining/identifying one or more vendors to receive the RFP. Alternatively, the consumer module 700 may receive user input identifying one or more vendors to receive the RFP. In various embodiments, the determination of one or more vendors to receive the RFP may be based at least in part on the location of vendor locations in relation to the regional consumer location in need of commodities/items, the type of equipment needed by the regional consumer location, the price to procure the commodities/items from the vendor, and/or the like.

In various embodiments, the RFP may be transmitted from the consumer module 700 (e.g., via the consumer communication interface 701) to the vendor module (e.g., via the vendor communication interface 601). Upon receipt by the vendor module 600, the RFP may be viewable by one or more vendor users associated with one or more vendors. Alternatively or additionally, the RFP may be transmitted from the consumer module 700 (e.g., via the consumer communication interface 701) to one or more vendors via one or more provided communication addresses (e.g., email address and/or facsimile number). Moreover, and indicated above, upon a vendor being identified to receive an RFP, the consumer module 700 and/or the vendor module 600 may be configured to enable one or more bidding features for vendor users associated with particular vendor profile. Accordingly, the consumer module 700 and/or the vendor module 600 may be configured to update the vendor profile associated with each vendor identified to present bids, such that the bid/response feature may be displayed via the GUI presented to a vendor user associated with the vendor profile.

Figures 8B, 8C:
Figure 8D:
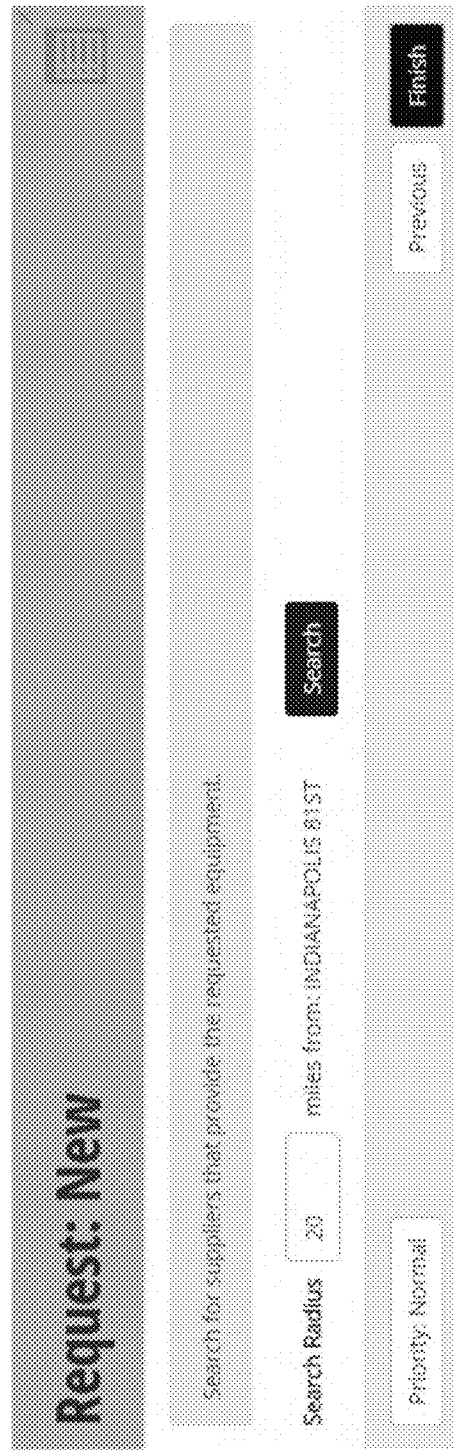
Figure 9:
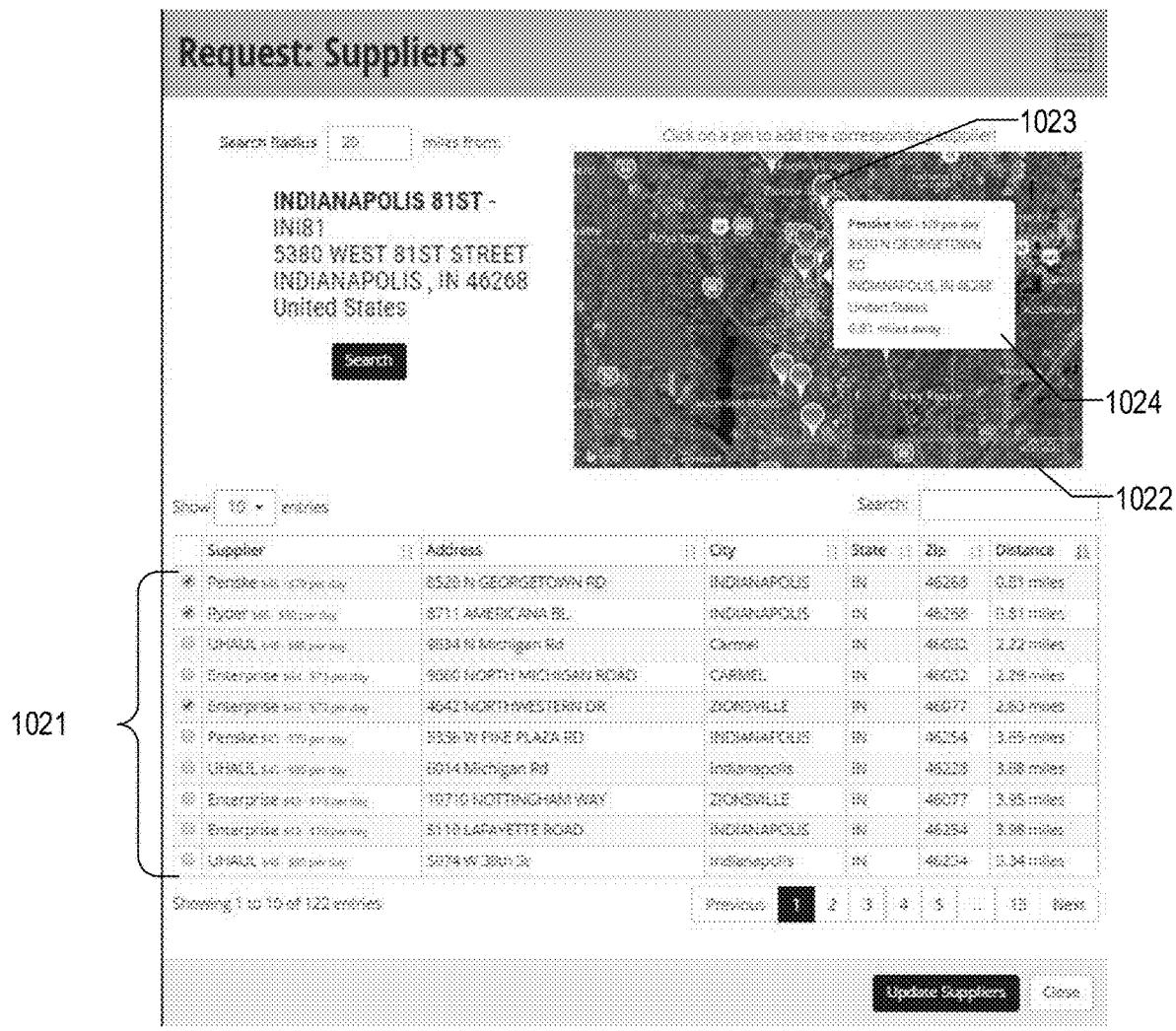
FIG. 9 is a user interface for accepting user interface for selecting one or more vendors.

FIGS. 7-9 provide a specific example for generating and transmitting RFPs to vendors according to various embodiments. Specifically, FIG. 7 (noted above) provides an example GUI providing a dashboard to a consumer user. As shown in FIG. 7, the dashboard provides an overview of existing RFPs, and provides information/data regarding the current status of these RFPs. For example, the dashboard provides a summary of the number of outstanding RFPs for which bids/responses have been received 1001, the number of RFPs for which bids/responses have been accepted and must be confirmed 1002, the number of outstanding RFPs that have not yet received any bids/responses 1003, and the total number of open RFP records 1004. The dashboard may additionally provide detailed information/data about each open RFP record 1005. As will be described in greater detail herein, the detailed information/data about each open RFP record 1005 may be sorted and/or filtered in order to provide information/data regarding only a subset of the total open RFP records. Moreover, the GUI may provide one or more options for generating an RFP. As shown in FIG. 7, the GUI may provide one option for generating a general RFP 1006, and another option for generating an emergency RFP 1007. As described above, by generating an RFP through the emergency RFP request 1007, the RFP may be associated with a deadline for responding, and may tagged and/or sorted separately.

In embodiments in which RFPs are generated in response to user input, upon a user selecting an option to generate a new RFP, the user may be directed to a GUI providing prompts to the user to provide additional detail regarding the new RFP. An example GUI is illustrated in FIGS. 8A-8D. As shown in FIG. 8A, the GUI may request that the user provide information/data regarding the consumer location for which the request is related at entry 1011. In various embodiments, this may be automatically provided by the system upon a determination that the user making the request is only associated with a single location. Moreover, in various embodiments, the system may only permit the user to select consumer locations for which the user is associated. The GUI may additionally request the user to provide one or more campaign tags to be associated with each request at entry 1012. These tags may be utilized to group and/or sort various requests. For example, the campaign tags may be utilized to logically group all requests to be associated with a particular year and/or time during a particular year. For example, all requests generated that are a result of a seasonal increase in commodities/items needed may be labeled as a part of the "peak season" campaign. Similarly, the GUI may request an explanation or justification of why the commodities/items are being requested at entry 1013. The user input provided as a justification or explanation may be stored as an information/data tag associated with each RFP record. These justifications, as well as the campaign tags, may be stored and are accessible to one or more consumer users, but may not be available to the one or more vendor users. Accordingly, such information/data may not be provided to vendors in the RFPs generated based on the provided user input.

Moreover, referring again to FIG. 8A, the GUI may request the user provide information/data indicative of the dates and/or times that the commodities/items are needed (e.g., a start date and/or an end date) at entry 1014. For example, when requesting equipment to be leased for a short period of time, the consumer user may provide information/data indicative of the start date and/or end date for which the equipment is requested. Moreover, as shown the RFP may define a bid/response receipt time period during which bids/responses will be accepted in response to the RFP at entry 1015. For example, the user may specify a start date/time and/or an end date/time during which time bid/response will be accepted. In response, the system may be configured to only enable bids/responses to be accepted during the bid/response receipt time period. Finally, as shown in FIG. 8A, the GUI may permit users to provide one or more comments to be provided as a part of the RFP that may not be captured via automatically and/or selected information/data at entry 1016. For example, the comments may provide information/data regarding a requested delivery location, requested equipment features, requested skills for temporary employees/personnel, and/or the like. These comments may be incorporated into RFPs generated based on the provided data. Moreover, in various embodiments, one or more additional comments may be provided to individual vendors. In such embodiments, these comments may not be included in the RFP data, but may instead be transmitted directly to the vendor such that the comments are available via the GUI provided to vendor users associated with the vendor.

The system may additionally request additional information/data regarding the commodities/items requested via the same or a separate GUI. For example, FIG. 8B provides an example GUI for selecting one or more commodities/items to request via the RFP. As shown in FIG. 8B, the GUI may provide a list of possible commodities/items that may be requested (e.g., in a "drop-down" style list enabling the user to select one or more options) at entry 1017. In various embodiments, the various commodities/items included in the list of possible commodities/items may correspond to a list of possible commodities/items from which vendors may select and identify as being available from the vendor, as described herein. Accordingly, the types of commodities/items requested correspond to standardized information/data stored in association with one or more vendor profiles. As shown in FIG. 8B, the GUI may additionally permit a user to input a quantity of commodities/items requested at entry 1018. In various embodiments, multiple types and/or quantities of various commodities/items may be provided in a single RFP. FIG. 8C illustrates an example GUI providing a listing of the total number and types of commodities/items to be requested in the RFP, and providing an option for adding new and/or additional commodities/items to be included in the request at 1019.

In various embodiments, the system may additionally permit users to define a search area (e.g., distance radius, geofence, and/or the like) for which the system will search for vendors from whom the requested commodities/items may be procured. Such features may be provided in a stand-alone GUI (as shown in FIG. 8D), or as a portion of a larger GUI configured to receive user input regarding a variety of request criteria, as described above. The search area may be defined in reference to the previously identified consumer location for which the commodities/items are being requested. For example, as shown in FIG. 8D, the search area may be defined as a distance radius away from the identified consumer location. As shown in FIG. 8D, the GUI may provide an entry 1020 configured to accept user input defining the size of the search area. Alternatively and/or additionally, the search area may be defined as being within a given geofenced area, as being within a given travel time away from the identified location, as being within a set of GPS coordinates, and/or the like.

Based on the received user input, the system may generate an RFP record (e.g., a temporary and/or a permanent record) to be stored in a memory storage area. The RFP record may comprise information/data indicating various parameters of the RFP, including, for example, a consumer location associated with the request, the type and quantity of commodities/items requested, the time period during which the commodities/items are to be requested, a bid/response request time period during which time the system may accept bids/responses from vendors, a campaign tag, a justification tag, and/or the like. The system may then compare the information/data stored in association with the RFP record against the vendor information/data stored in the one or more databases to identify one or more vendors that meet the criteria specified by the RFP record. The system filters the vendor information/data based on the RFP record to reflect only those vendors identified as satisfying the requirements of the RFP record. In various embodiments, the filtering process may compare the actual amount of commodities/items available during the requested periods of time against the parameters identified in the RFP record. For example, the system may consider both the types of commodities/items provided by each vendor location (e.g., the types of commodities/items that are typically stocked at the location) as well as scheduled reservations for the commodities/items (e.g., a lease reservation for all of a particular type of equipment typically offered by a vendor location). Thus, as a non-limiting example, the vendor information/data may indicate that a vendor location may have indicated that a particular type of equipment is normally in stock, however the vendor information/data may indicate that the equipment has been reserved for the dates and/or times during which the equipment is requested, and accordingly the vendor location will not be identified as capable of supplying the equipment. As yet another non-limiting example, the vendor information/data may indicate that a particular vendor location employs a professional certified to do a particular task, however the vendor information/data may indicate that that professional was previously scheduled to work for another entity during the requested time, and accordingly the vendor would not be identified as capable of supplying the requested services.

As discussed above, by filtering the vendor information/data such that only those vendors that may satisfy at least a portion of the RFP are identified, the system reduces the amount of processing power utilized in generating, transmitting, and/or receiving RFPs. Such filtering process ensures that vendors who are unable to fulfill even a portion of an RFP are not inundated with RFPs they cannot fulfill, which limits the amount of processing power necessary for the vendor computing entities 110 receiving and processing the RFPs. Similarly, the consumer computing entity 100 is not inundated with bids from vendors who are unable to fulfill even a portion of the RFP, thus limiting the processing power requirements for receiving and processing such bids.

Upon identifying vendors satisfying the parameters identified in the RFP record, the system generates/provides a GUI displaying only those vendors satisfying the parameters of the RFP. An example GUI providing filtered supplier information/data is provided in FIG. 9. As shown in FIG. 9, the GUI may provide a list 1021 of the filtered vendors providing various characteristics of each vendor, such as a name of the vendor, an address, a distance from the identified consumer location, a price for the identified commodities/items and/or the like. Moreover, the GUI may display the locations of the various vendors on a graphically displayed map 1022 as individual map identifiers 1023, and may be configured to selectably display additional information/data in an information/data box 1024 regarding each vendor location upon selecting (e.g., clicking on and/or hovering a cursor over) a particular displayed map indicator. Such displayed additional information/data may comprise the name of the vendor, the address of the vendor, the price of the commodities/items requested in the RFP, and/or the like. Moreover, in various embodiments, the indicators may be configured to provide an indication of whether the associated vendor location has been selected. For example, the indicators may change colors upon the associated vendors being selected.

Moreover, in various embodiments, the GUI may provide an indication of a vendor performance score and/or a relative hierarchy of vendors determined based on various performance metrics recorded by the commodity/item procurement system 400. For example, each vendor may be associated with a particular vendor performance score, which may be indicated in the GUI. In various embodiments, the filtered list of vendors 1021 may be organized hierarchically based on the determined relative vendor performance scores. In one embodiment, vendor scores/metrics are only available to consumers. In another embodiment, vendor scores/metrics are available to all users.

As shown in FIG. 9, the GUI may be configured to permit a user to select one or more of the filtered vendors to which the RFP will be transmitted.

Upon selecting one or more vendors to which the RFP will be transmitted, the commodity/item procurement system 400 is configured to transmit one or more RFP notifications/messages to the one or more communication addresses. Such RFP notifications/messages may provide information/data to representatives of the vendor indicating that an RFP has been received, and may provide information/data regarding one or more of the RFP parameters identified in the RFP record. Moreover, in various embodiments, upon one or more vendors being identified to receive an RFP, the commodity/item procurement system 400 is configured to enable vendor user profiles to access a bidding tool through which the vendor representative is permitted to provide bid/response data, as described in greater detail herein. Accordingly, the commodity/item procurement system 400 may be configured to update the vendor profiles associated with each of the vendors identified to receive the RFPs to indicate that the bidding tool is to be displayed via the GUI presented to vendor users.

5. Bids/Responses

As indicated at Block 905 of FIG. 6, the process may continue upon receipt of bid/response information/data from one or more vendors. In various embodiments, the bid/response information/data may be provided to the vendor module 600 via user input from one or more vendor users (e.g., a vendor user operating a user computing device 110). For example, the bid/response information/data may be provided via the bidding tool enabled for the vendors upon receipt of an RFP. In various embodiments, the bidding tool may provide a GUI to the vendor user providing the ability to adjust a price for one or more commodities/items to be offered. In various embodiments, upon a bid/response being finalized (e.g., via the bidding tool) the bid/response information/data may be provided from the vendor module 600 (e.g., via vendor communication interface 601) to the consumer module 700 (e.g., via the consumer communication interface 701). In various embodiments, the vendor module 600 may be configured to generate and transmit a bid/response receipt notification to one or more consumer users (e.g., via email, MMS, SMS, and/or the like) indicating that a bid/response has been received in response to the RFP. The communications may be transmitted to one or more consumer employees/personnel associated with the consumer location for which the RFP is associated.

The bid/response information/data may be provided in a format provided by the consumer (e.g., via a GUI having one or more fillable fields), or it may be provided in a format provided by the vendor. When provided in a format provided by the vendor, the consumer module 700 may be configured to convert the bid/response information/data into a consumer-specified format. For example, the bid/response information/data may be received via an API, and converted to a standardized format. As a non-limiting example, in order to facilitate the viewing of the bid/response information/data by one or more consumer users, the bid/response information/data may be presented via a user interface using a standardized format.

In various embodiments, the commodity/item procurement system 400 may be configured to identify various characteristics of the submitted bid, including the amount of time elapsed between the original transmission of the RFP and the submission of the corresponding bid, the price indicated in the bid, and/or the like. Such characteristics may be stored as performance metrics of the vendors. As noted above, such performance metrics may be utilized to generate a vendor performance score, which may be utilized to provide a hierarchical ranking of vendors to a consumer user when the consumer user is selecting one or more vendors to receive an RFP. For example, a higher performance score may be awarded to vendors who respond more quickly to RFPs. Moreover, the vendor performance score may be indicative of the distance between a vendor location and a consumer location (e.g., a shorter distance may correlate to a higher score), the price for a requested good and/or service (e.g., a lower price may correlate to a higher score), and/or the like.

Moreover, in various embodiments, one or more bids/responses may be generated that are indicative of the cost and time required to transport one or more consumer-operated commodities/items and/or employees/personnel in order to fulfill the need. In various embodiments, such bids/responses may be generated based at least in part on the cost and time required to permanently and/or temporarily relocate one or more consumer-operated commodities/items and/or employees/personnel. As a non-limiting example, a bid/response may be generated indicative of the cost to transport 3 tractor-trailers from a regional consumer location near Atlanta, Ga. to a regional consumer location near Fort Lauderdale, Fla., in order to fulfill a determined need for tractor-trailers at the Fort Lauderdale, Fla., location.

Moreover, in various embodiments, the commodity/item procurement system 400 may be configured to transfer one or more RFPs to an alternative vendor upon receipt of a user input from a vendor user requesting such a transfer. In various embodiments, the GUI provided to a vendor user for the bidding tool may permit the vendor user to identify an alternative vendor location to receive the RFP. In response to receipt of user input instructing the commodity/item procurement system 400 to transfer the RFP, the commodity/item procurement system 400 may transmit an RFP notification to a vendor user associated with the identified alternative vendor location (e.g., via email, SMS, MMS, and/or the like). Moreover, the commodity/item procurement system 400 may be configured to enable the bidding tool for the alternative vendor, as described herein. Moreover, in various embodiments, upon instructing the commodity/item procurement system 400 to transfer the RFP to an alternative vendor location, the commodity/item procurement system 400 may disable the bidding tool for the originally identified vendor location (e.g., the transferor). Moreover, in various embodiments, the commodity/item procurement system 400 may define one or more restrictions for transferring RFPs between vendor locations. For example, the commodity/item procurement system 400 may enable transfers of RFPs between vendor locations associated with a single vendor (e.g., between one or more of a single vendor's location), between vendor locations within a predefined geographical area (e.g., a predefined distance away from the consumer location), between vendor locations satisfying the RFP parameters, and/or the like.

6. Bid/Response Selection

As indicated at Block 906 of FIG. 6, the process may continue by the selection of one or more bids. As previously indicated, one or more bids/responses may be selected based at least in part on the type of commodities/items to be provided according to the terms of the bid, the price of the commodities/items under the terms of the bid, the distance between the vendor location and the regional consumer location in need of commodities/items, the estimated time of delivery at the regional consumer location, and/or the like.

Upon a determination of one or more bids/responses to be selected, the process may additionally comprise steps for determining/identifying whether the entire commodity/item need will be filled by the one or more selected bids. For example, if a particular regional consumer location identified a need of 25 delivery vehicles, and the selected bids/responses will only supply 15 delivery vehicles, it may be determined that an additional 10 delivery vehicles will be needed. Upon a determination that additional equipment will be needed, the process may repeat those steps indicated as Blocks 902-906 until the entire equipment need will be fulfilled by one or more vendors.

The steps of selecting one or more bids/responses may also comprise additional steps for generating and sending one or more notifications/messages to the one or more vendors (e.g., via the consumer communication interface) in order to inform the vendors whether their submitted bid/response was accepted. Moreover, upon acceptance of one or more bids, the commodity/item procurement system may automatically generate and transmit notifications/messages to those vendors that submitted bids/responses but were not accepted.

Upon acceptance of a bid, the commodity/item procurement system 400 may be configured to facilitate communications between the consumer and the selected vendor to share associated internal reference numbers/identifiers (e.g., equipment numbers, rental numbers, confirmation numbers, and/or the like). In various embodiments, the commodity/item procurement system 400 may be configured to identify one or more bids/responses as accepted upon receipt of one or more reference numbers/identifiers from a consumer user. For example, for each piece of equipment reserved for lease through the commodity/item procurement system 400 the consumer user may be required to provide a corresponding reference number/identifier, which may then be transmitted to the vendor. Upon receipt of the corresponding reference number/identifier for each requested good and/or service unit, the commodity/item procurement system 400 may be configured to indicate that a corresponding number of the requested commodities/items have been accepted. Accordingly upon receipt of a reference number/identifier for all of the requested commodities/items, the commodity/item procurement system 400 may be configured to notify other vendors which submitted bids/responses that their bid/response was not accepted. In various embodiments, the vendor may be permitted to provide one or more reference numbers/identifiers in response, such that the commodity/item procurement system 400 maintains a record of both the consumer's internal reference number/identifier for a particular good and/or service and the vendor's internal reference number/identifier for the same good and/or service. In various embodiments, the consumer reference number/identifier and/or the vendor reference number/identifier may be stored in association with the RFP record to indicate that the RFP has been fulfilled, and to provide information/data indicative of the vendor and commodities/items to fulfill the RFP.

7. Commodities/Items Return

Particularly in instances in which the commodity/item procurement system 400 is configured to facilitate the lease of commodities/items (e.g., equipment), the commodity/item procurement system 400 may additionally be configured to track when a particular leased good is scheduled to be returned to the vendor. In various embodiments, the commodity/item procurement system 400 may receive information/data (e.g., via an API) from the vendor system indicating when a good has been picked up (e.g., checked out) by the consumer, and may update the status of the RFP record to indicate that the commodities/items have been received by the consumer.

Moreover, the commodity/item procurement system 400 may monitor confirmed return dates for commodities/items leased through the commodity/item procurement system 400 as indicated in the RFP records, and may identify when the commodities/items are scheduled to be returned. Moreover, in various embodiments, the commodity/item procurement system 400 may be configured to receive information/data from a vendor system (e.g., via an API) indicating whether the commodities/items have been returned. For example, the commodity/item procurement system 400 may be configured to determine when equipment having a particular vendor reference number/identifier and/or consumer reference number/identifier has been returned by referencing information/data received from the vendor system, and may update the status of the commodities/items to reflect that the commodities/items have been returned.

In various embodiments, the commodity/item procurement system 400 may be configured to generate one or more alerts/notifications/messages to be transmitted to one or more consumer users upon a determination that the confirmed return date for commodities/items is approaching. In various embodiments, upon a determination that the confirmed return date is within a predefined threshold amount of time (e.g., within 1 week, within 1 day, and/or the like), the commodity/item procurement system 400 may generate and transmit one or more alerts/notifications/messages to one or more consumer users.

Moreover, in various embodiments, in response to receiving information/data (e.g., from the vendor system) that the commodities/items have been picked up by the consumer, the commodity/item procurement system 400 may be configured to enable a return facilitation feature available to the consumer user. In various embodiments, the return facilitation feature may be configured to, upon receipt of user input, generate and transmit a request to a third party entity (e.g., an equipment towing service) to retrieve the commodities/items and return the same to the vendor. In various embodiments, the return facilitation feature may be provided for each individual good, for each RFP record, and/or the like.

Upon receipt of user input requesting return of one or more commodities/items, the commodity/item procurement system 400 may generate and transmit a notification providing a description of the commodities/items to be returned, the consumer reference number/identifier and/or the vendor reference number/identifier of the commodities/items to be returned, the current location of the commodities/items to be returned (e.g., at the regional consumer location), the vendor location to which the commodities/items are to be returned, and/or the like. In various embodiments, the consumer user may be permitted to provide one or more comments to be included in the notification.

In various embodiments, the request return feature may enable the generation of an RFP for commodities/items return services utilizing one or more features as described herein. For example, the request return feature may enable consumer users to identify one or more third parties able to return the requested commodities/items, to transmit one or more RFPs to select third parties, and to select one or more bids/responses for the commodities/items return services. Each of such features are described herein.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An item procurement system comprising one or more memory storage areas and one or more computer processors, the item procurement system configured to:
   receive, over a wired or wireless computer network, vendor data indicative of items that are within current inventories of a plurality of vendors, wherein the vendor data is associated with one or more vendor profiles each corresponding to an individual vendor;
   receive, over the wired or wireless computer network, request data from a consumer computing entity that indicates one or more procurement parameters for procuring items associated with a consumer;
   filter the vendor data by comparing the request data and the vendor data and reducing the vendor data to a subset of data corresponding to one or more vendors, of the plurality of vendors, that are capable of providing items from a current inventory of the one or more vendors, satisfying the procurement parameters, wherein one or more other vendors, of the plurality of vendors, are identified as not being capable of providing items from a current inventory of the one or more other vendors, that satisfy the procurement parameters, based on the filtering;
   provide, in response to the filtering and over the wired or wireless computer network, a user interface to the consumer computing entity indicating the one or more vendors that are capable of providing items satisfying the procurement parameters, wherein the user interface is configured to permit selection of the one or more vendors; and
   in response to a selection, via the user interface, of the one or more vendors, update vendor data associated with one or more vendor profiles corresponding to the selected one or more vendors to enable vendor access to a response tool for the selected one or more vendors, wherein the response tool is configured to receive data indicative of a response only from the selected one or more vendors to provide the items satisfying the procurement parameters to the consumer, and wherein the response tool does not receive a response from the one or more other vendors based at least in part on the filtering, thereby reducing a required computing capacity for processing responses.

2. The item procurement system of claim 1, wherein the procurement parameters comprise at least one of: a maximum distance away from a consumer location; a time period; a type of item; or a quantity of item.

3. The item procurement system of claim 1, wherein the interface is configured to indicate the locations of the one or more vendors via a graphically displayed map.

4. The item procurement system of claim 1, wherein the one or more processors are further configured to provide a notification for each of the selected vendors.

5. The item procurement system of claim 1, wherein the response tool is configured to receive user input indicative of a response from the selected vendors and to provide the response to the consumer for review.

6. The item procurement system of claim 5, further configured to:
   receive, at the consumer computing entity, user input selecting one or more responses provided to the consumer; and
   upon selection of one or more responses, provide a notification to each vendor which submitted a response indicating the status of the respective responses.

7. The item procurement system of claim 6, wherein the notifications comprise acceptance notifications to be sent to those vendors associated with the accepted responses and rejection notifications to be sent to those vendors associated with the unselected responses.

8. The item procurement system of claim 7, further configured to receive one or more reference identifiers associated with items associated with the one or more selected responses.

9. The item procurement system of claim 1, further configured to:
   monitor one or more performance attributes of one or more of the selected vendors, and
   determine a performance score indicative of the one or more performance attributes and store the performance score in association with the corresponding vendor profile.

10. A computer-implemented method for procuring one or more items, the method comprising the steps of:
    receiving, via one or more processors, real-time vendor data indicative of items that are currently available from a plurality of vendors, and wherein the vendor data is associated with one or more vendor profiles each corresponding to an individual vendor;
    receiving, via the one or more processors, request data from a consumer that indicates one or more procurement parameters for procuring items;
    filtering, via the one or more processors, the vendor data based on comparing the request data and the vendor data and reducing the vendor data to a first subset of one or more vendors, of the plurality of vendors, that are capable of providing items from a current inventory of the first subset of one or more vendors, satisfying the procurement parameters, wherein a second subset of the plurality of vendors are identified as not being capable of providing items from a current inventory of the second subset of one or more vendors, that satisfy the procurement parameters, based on the filtering;
    providing, via the one or more processors, an interface indicating the subset of one or more vendors identified as satisfying the procurement parameters, wherein the interface is configured to permit selection of the subset of one or more identified vendors; and
    upon selection of the subset of one or more identified vendors, updating, via the one or more processors, vendor data associated with one or more vendor profiles corresponding to the selected subset of one or more identified vendors to enable vendor access to a response tool for the selected subset of one or more identified vendors, wherein the response tool is configured to receive data indicative of a response from the selected subset of one or more identified vendors to provide the items satisfying the procurement parameters to the consumer.

11. The method of claim 10, wherein the procurement parameters comprise at least one of: a maximum distance away from a consumer location; a time period, a type of item; or a quantity of item.

12. The method of claim 10, further comprising steps for providing a notification to each of the selected identified vendors.

13. The method of claim 10, wherein the response tool is configured to receive user input indicative of a response from the vendor and to provide the response to the consumer for review.

14. The method of claim 13, further comprising steps for:
    receiving user input selecting one or more responses provided to the consumer; and
    upon selection of one or more responses, providing a notification to each vendor which submitted a response indicating the status of the respective responses.

15. The method of claim 10, further comprising steps for:
    monitoring one or more performance attributes of one or more of the vendors, and
    determining a performance score indicative of the one or more performance attributes and storing the performance score in association with the corresponding vendor profile.

16. A computer program product comprising at least one non-transitory computer-readable storage medium having computer-readable program code portions stored therein, the computer-readable program code portions comprising:
    an executable portion for receiving vendor data indicative of items that are currently within vendor inventory and available from a plurality of vendors, and wherein the vendor data is associated with one or more vendor profiles each corresponding to an individual vendor;
    an executable portion for request data from a consumer that indicates one or more procurement parameters for procuring requested items;
    an executable portion for filtering the vendor data by comparing the request data and the vendor data to identify one or more vendors providing the requested items from a current inventory and satisfying the procurement parameters;
    an executable portion for providing an interface indicating one or more vendors identified as satisfying the procurement parameters, wherein the interface is configured to permit selection of one or more of the identified vendors; and
    an executable portion for, upon selection of one or more of the identified vendors, updating vendor data associated with one or more vendor profiles corresponding to the selected identified vendors to enable vendor access to a response tool for the selected identified vendors, wherein the response tool is configured to receive data indicative of a response from the selected identified vendors to provide the items satisfying the procurement parameters to the consumer.

17. The computer program product of claim 16, wherein the procurement parameters comprise at least one of: a maximum distance away from a consumer location; a time period, a type of item; or a quantity of item.

18. The computer program product of claim 16, further comprising an executable portion for providing a notification to each of the selected identified vendors.

19. The computer program product of claim 16, wherein the response tool is configured to receive user input indicative of a response from the vendor and to provide the response to the consumer for review.

20. The computer program product of claim 19, further comprising:
- an executable portion for receiving user input selecting one or more responses provided to the consumer; and
- an executable portion for, upon selection of one or more responses, providing a notification to each vendor which submitted a response indicating the status of the respective responses.

21. The computer program product of claim 16, further comprising:
- an executable portion for monitoring one or more performance attributes of one or more of the vendors, and
- an executable portion for determining a performance score indicative of the one or more performance attributes and storing the performance score in associate with the corresponding vendor profile.

* * * * *

UNITED STATES PATENT AND TRADEMARK OFFICE
CERTIFICATE OF CORRECTION

PATENT NO. : 10,692,121 B2
APPLICATION NO. : 14/918180
DATED : June 23, 2020
INVENTOR(S) : Timothy Nelson Stephenson It is certified that error appears in the above-identified patent and that said Letters Patent is hereby corrected as shown below:

In the Specification

In Column 33, Line 23, delete "that that" and insert -- that --, therefor.

In the Claims

In Column 41, Line 22, Claim 21, delete "associate" and insert -- association --, therefor.

Signed and Sealed this
Eighteenth Day of August, 2020

Andrei Iancu
*Director of the United States Patent and Trademark Office*